United States Patent
Heggelund et al.

(10) Patent No.: US 10,726,610 B2
(45) Date of Patent: Jul. 28, 2020

(54) EFFICIENT GRAPHICS PROCESSING USING METADATA

(71) Applicant: Arm Limited, Cambridge (GB)

(72) Inventors: Frode Heggelund, Trondheim (NO); Toni Viki Brkic, Staffanstorp (SE); Christian Vik Grovdal, Trondheim (NO); Lars Oskar Flordal, Uppsala (SE)

(73) Assignee: Arm Limited, Cambridge (GB)

( * ) Notice: Subject to any disclaimer, the term of this patent is extended or adjusted under 35 U.S.C. 154(b) by 29 days.

(21) Appl. No.: 16/116,137

(22) Filed: Aug. 29, 2018

(65) Prior Publication Data
US 2020/0074721 A1    Mar. 5, 2020

(51) Int. Cl.
*G06T 15/40* (2011.01)
(52) U.S. Cl.
CPC .................. *G06T 15/405* (2013.01)
(58) Field of Classification Search
None
See application file for complete search history.

(56) References Cited

U.S. PATENT DOCUMENTS

| | | |
|---|---|---|
| 6,259,452 B1 | 7/2001 | Coorg |
| 6,525,726 B1 | 2/2003 | Xie |
| 6,646,639 B1 | 11/2003 | Greene |
| 7,027,047 B2 | 4/2006 | Kim |
| 7,068,272 B1 | 6/2006 | Voorhies |
| 7,119,809 B1 | 10/2006 | McCabe |
| 8,081,184 B1 | 12/2011 | Nordquist |
| 8,130,222 B1 | 3/2012 | Urry |
| 8,854,364 B1 | 10/2014 | Voorhies |
| 9,153,070 B2 | 10/2015 | Nystad |
| 9,214,006 B2 | 12/2015 | Heggelund |
| 9,519,982 B2 | 12/2016 | Heggelund |

(Continued)

FOREIGN PATENT DOCUMENTS

| | | |
|---|---|---|
| GB | 2496716 | 5/2013 |
| GB | 2510964 | 8/2014 |

(Continued)

OTHER PUBLICATIONS

Combined Search and Examination Report dated Jun. 19, 2014, in Great Britain Patent Application No. GB13222E34.9, 5 pages.

(Continued)

*Primary Examiner* — Vu Nguyen
(74) *Attorney, Agent, or Firm* — Vierra Magen Marcus LLP

(57) ABSTRACT

A graphics processing system maintains a fragment tracking record that stores metadata relating to one or more previously received primitives. The metadata can indicate that the one or more previously received primitives are suitably covered by a subsequently received primitive such that one or more fragment processing operations need not be performed in respect of those one or more previously received primitives. The metadata stored for the one or more previously received primitives can then later be queried by one or more later stages of the graphics processing system to determine whether one or more fragments for the one or more previously received primitives can be at least partially discarded or "killed".

19 Claims, 5 Drawing Sheets

(56) References Cited

U.S. PATENT DOCUMENTS

| | | | |
|---|---|---|---|
| 9,558,585 | B2 | 1/2017 | Nystad |
| 10,043,306 | B2 | 8/2018 | Isomaki |
| 2001/0055015 | A1 | 12/2001 | Iourcha |
| 2004/0061699 | A1 | 4/2004 | Tjew |
| 2004/0119710 | A1 | 6/2004 | Piazza |
| 2004/0246251 | A1 | 12/2004 | Fenney |
| 2006/0139366 | A1 | 6/2006 | Piazza |
| 2008/0068375 | A1 | 3/2008 | Min |
| 2008/0117221 | A1 | 5/2008 | Hitchins |
| 2010/0007662 | A1 | 1/2010 | Cox |
| 2012/0268465 | A1 | 10/2012 | Inada |
| 2012/0293515 | A1 | 11/2012 | Clarberg |
| 2013/0076762 | A1 | 3/2013 | Heggelund |
| 2013/0141445 | A1 | 6/2013 | Eng-Halstvedt |
| 2013/0241938 | A1 | 9/2013 | Gruber |
| 2013/0342547 | A1 | 12/2013 | Lum |
| 2014/0085300 | A1 | 3/2014 | Andersson |
| 2014/0267224 | A1* | 9/2014 | Lum .................. G06T 15/005 345/419 |
| 2014/0267258 | A1 | 9/2014 | Yang |
| 2015/0022519 | A1 | 1/2015 | Lum |
| 2015/0269771 | A1 | 9/2015 | Hasselgren |
| 2018/0349315 | A1 | 12/2018 | Heggelund |

FOREIGN PATENT DOCUMENTS

| | | |
|---|---|---|
| GB | 2517032 | 2/2015 |
| GB | 2517033 | 2/2015 |

OTHER PUBLICATIONS

Aila, et al., "Delay Streams for Graphics Hardware," 2003.
Out-of-order execution, Wikipedia, Dec. 9, 2013, 4 pgs., Available at http://en.wikipedia.org/wiki/Out-of-order_execution.
Slipstream (computer science), Wikipedia, Dec. 9, 2013, 1 pg., Available at http://en.wikipedia.org/wiki/Slipstream_(computer_science).
Speculative execution, Wikipedia, Dec. 9, 2013, 3 pgs., Available at http://en.wikipedia.org/wiki/Speculative_execution.
Examination Report dated Mar. 2, 2016 in GB Patent Application No. GB1409585.5.
Early Fragment Test, by Open GL.org, Jul. 27, 2013, Available at: http://www.opengl.org/wiki/Early_Depth_Test.
Hidden Surface Removal—12a (Visible Surface determination), 24 pp., Apr. 20, 2009, University of Bath, Department of Computer Science, Bath, UK, Available at: http://www.cs.bath.ac.uk/~djp/30075-CG-12a-hiddenSurfaces.ppt.
Visible Surface Algorithms, Chapter 7, pp. 264-293, Oct. 15, 2005, 2009 Nanjing University of Aeronautics Aeronautical Engineering Experimental Teaching Center, Available at: http://gc.nuaa.edu.cn/hangkong/zjj/cad2/Computer%20graphics%20and%20geometric%20modeling%20implementation%20and%20algorithms/7.pdf.
Combined Search and Examination Report in GB Patent Application No. GB1322278.1 dated Jun. 19, 2014, 5 pages.
Combined Search and Examination Report dated Dec. 9, 2014 in GB Patent Application No. GB1409584.8, 4 pages.
Digital Differential Analyzer (graphics algorithm), Jan. 10, 2013, Available at: http://en.wikipedia.org/wiki/Digital_differential_Analyzer_(graphics_algorithm), 2 pages.
Examination Report dated Mar. 2, 2016 in GB Patent Application No. GB1409584.8.
Greene, Hierarchical Polygon Tiling with Coverage Masks, 1996, 12 pages.
Warnock, A Hidden Surface Algorithm for Computer Generated Halftone Pictures, Jun. 1969, 35 pages, National Technical Information Service, U.S. Department of Commerce.
GB Combined Search and Examination Report, dated Dec. 10, 2015, GB Patent Application GB1510866.5.
Bittner et al., Hierarchical Visibility Culling with occlusion Trees, 1998, IEEE Computer Graphics International, pp. 207-219.
GB 1912311.6—Office Action dated Feb. 24, 2020, 7 pages.

* cited by examiner

EFFICIENT GRAPHICS PROCESSING USING METADATA

BACKGROUND

The technology described herein relates to computer graphics processing, and in particular to the processing of graphics primitives when generating a render output in a computer graphics processing system.

Graphics processing is normally carried out by first splitting the desired render output, e.g. the frame to be displayed, into a number of similar basic components or "primitives", which primitives are then subjected to the desired graphics processing operations. The graphics primitives are usually in the form of simple polygons, such as triangles or quadrilaterals.

Each primitive is usually defined by and represented as a set of vertices. Each vertex for a primitive has associated with it a set of data (such as position, colour, texture and other attributes data) representing the vertex. This data is then used, e.g., when rasterising and rendering the primitive(s) to which the vertex relates, e.g. for display.

Once primitives and their vertices have been generated and defined, they can be processed by the graphics processing system, in order, e.g., to render the frame. This process basically involves determining which sampling positions of an array of sampling positions covering the output area to be processed are covered by a primitive, and then determining the appearance that each sampling point should have (e.g. in terms of its colour, etc.) to represent the primitive at that sampling position. These processes are commonly referred to as rasterising and rendering, respectively.

The rasterising process typically determines the sampling points that should be used for a primitive (i.e. the (x, y) sampling positions for sampling points to be used to represent the primitive in the render output, e.g. frame to be displayed).

The rendering process then derives the data, such as red, green and blue (RGB) colour values and an "Alpha" (transparency) value, necessary to represent the primitive at the sampling positions (i.e. "shades" each sampling point). This can involve applying textures, blending sampling point data values, etc.

In 3D graphics literature, the term "rasterisation" is sometimes used to mean both primitive conversion to sampling points and rendering. However, herein "rasterisation" will be used to refer to converting primitive data to sampling point addresses only.

The rasterisation process basically maps the primitives defining the render output to be generated to the sampling points that will be used to render the output. This is typically done by determining, for each sampling point, whether the sampling point position is covered by the primitive in question or not. This determination is typically done by testing the sampling points' positions against the edges of the primitive, to see if the sampling points are covered by the primitive. To do this, graphics processing systems typically derive (line) equations representing each of the edges of a primitive (e.g. using the defined vertices of the primitive), and then test the sampling points' positions using these edge equations. If a sampling point "passes" the edge test, it is taken to be within the primitive.

The rasterisation process is typically carried out by testing sets of one or more sampling points. For each set of one or more sampling points found to include a sampling point that is covered by the primitive in question (being tested), a discrete graphical entity usually referred to as a graphics "fragment", on which the subsequent graphics processing operations (such as rendering) are to be carried out, is then generated by the rasteriser and sent to the rest of the graphics processing pipeline (such as the renderer) for processing.

One drawback of current graphics processing systems is that because primitives are processed sequentially, and typically not in perfect front-to-back order, a given sampling position (and hence pixel(s)) may be shaded multiple-times as an output is processed, e.g. for display. This occurs when a first received and rendered primitive is later covered by a subsequently received and rendered primitive, such that the rendered first primitive is not in fact seen at the sampling position(s) (and pixel(s)) in question. Primitives can be overwritten many times in this manner and this typically leads to multiple, ultimately redundant, graphics processing (rendering) operations being carried out for each render output, e.g. frame, being rendered. This phenomenon is commonly referred to as "overdraw".

A number of techniques have therefore been proposed to try to reduce the amount of "overdraw" (the amount of redundant processing of hidden surfaces) that is performed when processing a render output, such as a frame for display (i.e. to avoid rendering non-visible primitives and/or fragments, etc.).

For example, forms of hidden surface removal may be carried out before a primitive and/or fragment is sent for rendering, to see if the primitive or fragment etc. will be obscured by a primitive that has already been rendered (in which case the new primitive and/or fragment need not be rendered). Such hidden surface removal may comprise, for example, early occlusion culling, such as early depth (Z) and/or stencil (S) testing processes. These arrangements try to identify, e.g., sampling points for a new primitive that will be occluded by already processed primitives (and therefore that do not need processing) before the sampling points are issued to the rendering pipeline. In these arrangements, the depth value, e.g., of a new primitive to be rasterised at the sampling position(s) in question is compared to the current depth values for the sampling position(s) in a depth buffer to see if the new primitive is occluded at the sampling position(s) in question or not. This can help to avoid sending fragments that are occluded by already processed primitives through the rendering pipeline.

For another example, other forms of hidden surface removal developed by the Applicant may be carried out after primitives and/or fragments are sent for rendering. These arrangements may try to identify, e.g., sampling points for a primitive and/or fragment currently being processed that will be occluded by a newly received primitive. In these arrangements, the depth value, e.g., of a newly received primitive to be rasterised at the sampling position(s) in question may be compared to the current depth values for the sampling position(s) in a depth buffer to see if the newly received primitive will result in overdraw at the sampling position(s) in question or not. A "forward pixel kill" signal may then be sent to one or more later stages of the graphics processing pipeline. This can help to reduce the amount of further processing of fragments for primitives that will eventually be overdrawn by newly received primitives that enter the rendering pipeline by discarding or "killing" those fragments at a later stage of the graphics processing pipeline.

The Applicants believe there remains scope for improvements in processing graphics primitives when generating a render output in a graphics processing system.

BRIEF DESCRIPTION OF THE DRAWINGS

Embodiments of the technology described herein will now be described by way of example only and with reference to the accompanying drawings, in which.

DETAILED DESCRIPTION

Figure 1:
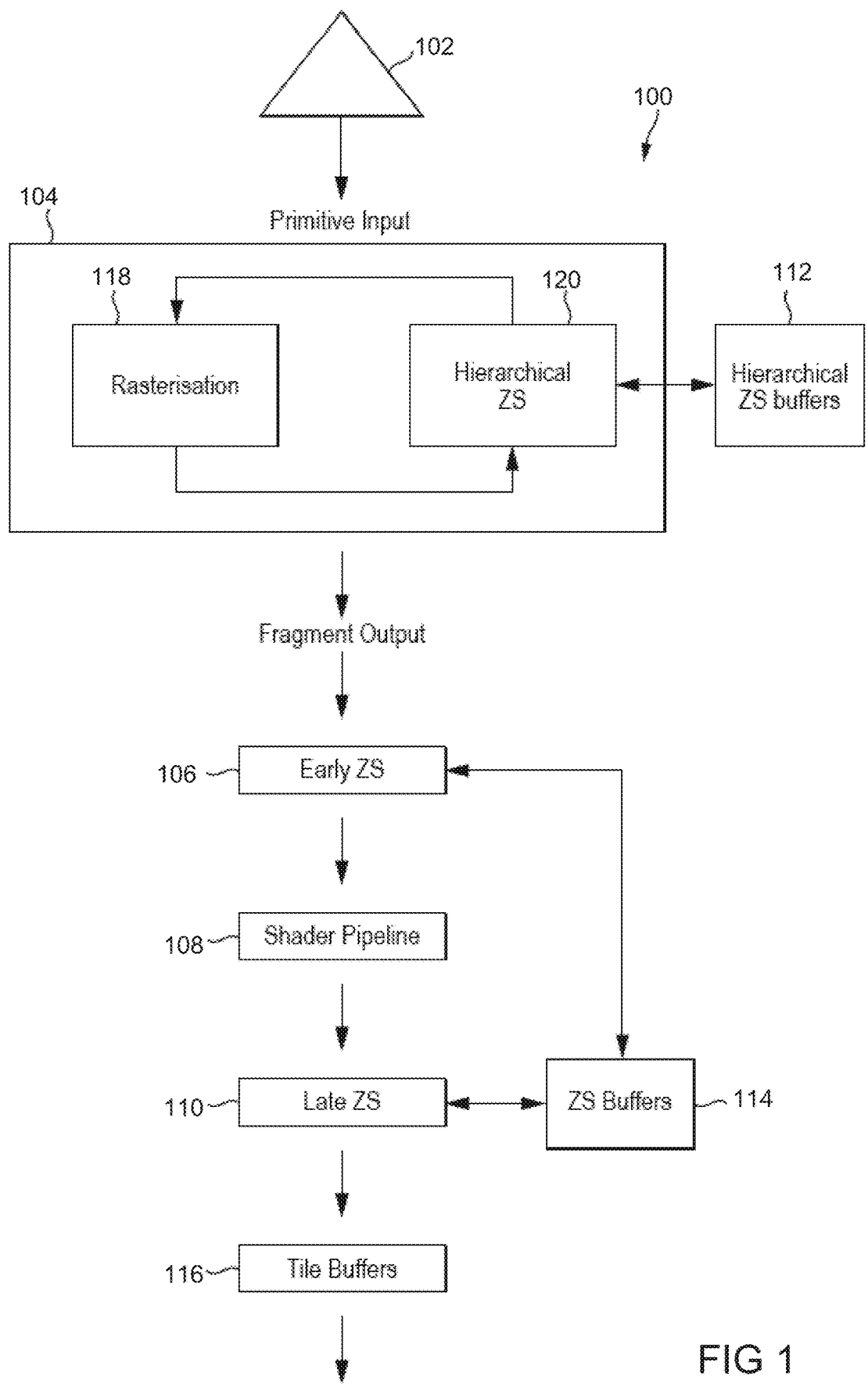
FIG. 1 shows schematically a graphics processing system that can be operated in accordance with the technology described herein.

An embodiment of the technology described herein comprises a method of processing graphics primitives when generating a render output in a graphics processing system, the method comprising:

performing, by one or more earlier stages of the graphics processing system, the steps of:

determining whether a subsequently received primitive to be rasterised suitably covers a previously received primitive such that one or more fragment processing steps need not be performed in respect of the previously received primitive; and when it is determined that the subsequently received primitive to be rasterised suitably covers the previously received primitive such that one or more fragment processing steps need not be performed in respect of the previously received primitive, storing metadata for the previously received primitive that indicates that those one or more fragment processing steps need not be performed in respect of the previously received primitive; and performing, by one or more later stages of the graphics processing system, the steps of:

prior to performing one or more fragment processing steps in respect of the previously received primitive, querying the metadata stored for the previously received primitive to determine whether one or more fragment processing steps need not be performed in respect of the previously received primitive; and when it is determined that one or more fragment processing steps need not be performed in respect of the previously received primitive, not performing those one or more fragment processing steps in respect of the previously received primitive.

Another embodiment of the technology described herein comprises a graphics processing system for processing graphics primitives when generating a render output, the system comprising:

one or more earlier stages comprising primitive processing circuitry configured to:

determine whether a subsequently received primitive to be rasterised suitably covers a previously received primitive such that one or more fragment processing steps need not be performed in respect of the previously received primitive; and when it is determined that the subsequently received primitive to be rasterised suitably covers the previously received primitive such that one or more fragment processing steps need not be performed in respect of the previously received primitive, store metadata for the previously received primitive that indicates that those one or more fragment processing steps need not be performed in respect of the previously received primitive; and one or more later stages comprising fragment processing circuitry configured to:

prior to performing one or more fragment processing steps in respect of the previously received primitive, query metadata stored for the previously received primitive to determine whether one or more fragment processing steps need not be performed in respect of the previously received primitive; and when it is determined that one or more fragment processing steps need not be performed in respect of the previously received primitive, not perform those one or more fragment processing steps in respect of the previously received primitive.

The technology described herein can accordingly help to reduce the amount of processing of fragments performed in respect of a previously received primitive that is later found by one or more earlier stages to be suitably covered by a subsequently received primitive. In the technology described herein, this is achieved by the graphics processing system storing (e.g. in a "fragment tracking record") metadata relating to the previously received primitive. The metadata can be set to indicate that the previously received primitive is covered by (e.g. will have its data overwritten by) a subsequently received primitive. The metadata stored for the previously received primitive can then later be queried by one or more later stages of the graphics processing system, for example when one or more fragments relating to that previously received primitive are received for processing by those one or more later stages of the graphics processing system, to thereby determine whether one or more fragments for the previously received primitive can be, at least partially, discarded or "killed".

Thus, in the technology described herein, rather than sending out a "forward pixel kill" signal to one or more later stages of the graphics processing system, the graphics processing system stores metadata for a previously received primitive that can be queried by a subsequent stage of the graphics processing system, e.g. at a more appropriate time for that subsequent stage of the graphics processing system. This can, for example, help to reduce the amount of unnecessary and/or untimely signals sent to the one or more later stages of the graphics processing system, and this in turn can reduce the processing burden placed on the graphics processing system.

Furthermore, and as will be discussed in more detail below, the metadata stored for the previously received primitive can provide for a more sophisticated process of discarding or "killing" fragments, for example including only partially discarding or "partially killing" some fragments by indicating that some but not all of the fragment processing operations to be performed can be skipped.

The one or more earlier stages of the graphics processing system may take any desired and suitable form. In embodiments, the one or more earlier stages of the graphics processing system may, for example, comprise or form part of a rasteriser.

The one or more later stages of the graphics processing system may also take any desired and suitable form. In embodiments, the one or more later stages of the graphics processing system may, for example, comprise a fragment output buffer that issues fragments, e.g. generated by the rasteriser, to one or more even later stages of the graphics processing system. Thus, the one or more fragment processing steps that need not be performed (and, e.g., that are not performed) in respect of the previously received primitive may comprise a step of issuing one or more fragments, e.g. generated by the rasteriser, in respect of the previously received primitive to one or more even later stages of the graphics processing system. These embodiments can allow fragments to be discarded or "killed" at a very early stage in the graphics processing pipeline.

In embodiments, the one or more (e.g. even) later stages of the graphics processing system may also or instead comprise one or more of: an early fragment depth and/or stencil testing stage; a fragment renderer (shader); and a late fragment depth and/or stencil testing stage. Thus, the one or more fragment processing steps that need not be performed (and, e.g., that are not performed) in respect of the previously received primitive may also or instead comprise one or more of: a step of performing an early fragment depth and/or stencil test; a step of writing out early fragment depth and/or stencil test results to a (e.g. depth and/or stencil) buffer of the graphics processing system; a step of performing fragment rendering (shading) to generate rendered (shaded) fragment data; a step of writing out rendered (shaded) fragment data to a (e.g. tile) buffer of the graphics processing system; a step of performing a late fragment depth and/or stencil test; and a step of writing out late fragment depth and/or stencil test results to a (e.g. depth and/or stencil) buffer of the graphics processing system.

In this regard, as discussed above, it has been further identified that it may be desirable to only partially discard or "partially kill" some fragments by skipping some but not all of the fragment processing operations to be performed in respect of a primitive. For example, the one or more fragment processing steps that need not be performed (and, e.g., that are not performed) in respect of the previously received primitive may comprise a step of performing a (e.g. early and/or late) fragment depth and/or stencil test and/or a step of writing out (e.g. early and/or late) fragment depth and/or stencil test results to a (e.g. depth and/or stencil) buffer of the graphics processing system. However, a step of performing fragment rendering (shading) to generate rendered (shaded) fragment data and/or a step of writing out rendered (shaded) fragment data to a (e.g. tile) buffer of the graphics processing system may still be performed in respect of the previously received primitive. This can, for example, help to reduce the amount of fragment processing performed and/or memory bandwidth used when processing the one or more fragments of the previously received primitive (by avoiding the need to perform depth and/or stencil testing and/or write out depth and/or stencil results, e.g. when the previously received primitive is covered by a semi-transparent subsequently received primitive or where the previously received primitive has other side effects), but this can still allow the previously received primitive to contribute appropriately to the render output (by performing fragment rendering (shading) to generate rendered fragment data, e.g. to be combined (e.g. blended) with rendered fragment data of the subsequently received primitive).

Thus, in embodiments, when determining whether the subsequently received primitive to be rasterised suitably covers the previously received primitive such that one or more fragment processing steps need not be performed in respect of the previously received primitive, the one or more earlier stages may determine specifically which one or more fragment processing steps of plural fragment processing steps need not be performed in respect of the previously received primitive, and may store metadata for the previously received primitive that indicates specifically which one or more fragment processing steps of plural fragment processing steps need not be performed in respect of the previously received primitive.

Similarly, in embodiments, when determining whether the subsequently received primitive to be rasterised suitably covers the previously received primitive such that one or more fragment processing steps need not be performed in respect of the previously received primitive, the one or more earlier stages may determine specifically which one or more fragment processing steps of plural fragment processing steps do need to be performed in respect of the previously received primitive, and may store metadata for the previously received primitive that indicates specifically which one or more fragment processing steps of plural fragment processing steps do need to be performed in respect of the previously received primitive.

Thus, in embodiments, the metadata stored for the previously received primitive may indicate specifically which one or more fragment processing steps of plural fragment processing steps need not be performed in respect of the previously received primitive and/or may indicate specifically which one or more fragment processing steps of plural fragment processing steps do need to be performed in respect of the previously received primitive.

Furthermore, in embodiments, when querying the metadata stored for the previously received primitive to determine whether one or more fragment processing steps need not be performed in respect of the previously received primitive, the one or more later stages may query the metadata stored for the previously received primitive to determine specifically which one or more fragment processing steps of plural fragment processing steps need not be performed in respect of the previously received primitive and, in response to determining specifically which one or more fragment processing steps of plural fragment processing steps need not be performed in respect of the previously received primitive, may not perform those one or more fragment processing steps in respect of the previously received primitive.

Similarly, in embodiments, when querying the metadata stored for the previously received primitive to determine whether one or more fragment processing steps need not be performed in respect of the previously received primitive, the one or more later stages may query the metadata stored for the previously received primitive to determine specifically which one or more fragment processing steps of plural fragment processing steps do need to be performed in respect of the previously received primitive and, in response to determining specifically which one or more fragment processing steps of plural fragment processing steps do need to be performed in respect of the previously received primitive, may perform those one or more fragment processing steps in respect of the previously received primitive.

As indicated above, the one or more fragment processing steps of the plural fragment processing steps that specifically need not be performed (and, e.g., are not performed) in respect of the previously received primitive may comprise a step of performing a (e.g. early and/or late) fragment depth and/or stencil test and/or a step of writing out (e.g. early and/or late) fragment depth and/or stencil test results to a (e.g. depth and/or stencil) buffer of the graphics processing system.

As is also indicated above, the one or more fragment processing steps of plural fragment processing steps that specifically do need to be performed (and, e.g., are performed) in respect of the previously received primitive may comprise a step of performing fragment rendering (shading) to generate rendered (shaded) fragment data and/or a step of writing out rendered (shaded) fragment data to a (e.g. tile) buffer of the graphics processing system.

The metadata for a primitive may be stored in any desired and suitable storage that is able to be accessed by the one or more earlier processing stages and the one or more later processing stages of the graphics processing system. The storage may be dedicated storage for the purpose of storing the required metadata, or it may be part of storage that is used to store other data in addition to that metadata. The storage may be any desired and suitable data storage, such as, e.g., a register or registers, a buffer or buffers, a cache or caches, main memory, etc.

In embodiments, a fragment tracking record may be provided that stores one or more (and typically plural) sets of such metadata respectively for one or more (and typically plural) received primitives.

The fragment tracking record may be created and/or maintained by the graphics processing system in any desired and suitable way. For example, in embodiments, when a primitive is received by the one or more earlier stages, a set of metadata may be associated with that received primitive in an entry of the fragment tracking record. A set of metadata may, for example, be associated with a received primitive when it is determined (and, e.g., in response to it being determined) that one or more fragments will be generated for that received primitive. However, a set of metadata may not be associated with a received primitive when it is determined (and, e.g., in response to it being determined) that no fragments will be generated for that received primitive. This can, for example, provide complete tracking of all primitives that will generate fragments to be processed by one or more later stages of the graphics processing system.

The metadata stored for a (and, e.g., each) received primitive may take any desired and suitable form that is capable of indicating whether one or more fragment processing steps do or do not need to be performed in respect of that primitive. The metadata stored for a (and, e.g., each) received primitive may, for example, comprise one or more discard indicators (bits) (e.g. one or more "discard flags") that each indicate whether one or more fragment processing steps do or do not need to be performed in respect of the previously received primitive (e.g. that each indicate whether one or more buffers that that primitive writes to will be overwritten by a subsequently received primitive).

In embodiments, the metadata stored for a (and, e.g., each) primitive may, at least when the primitive is initially received, be set to indicate that one or more or all fragment processing steps should be performed in respect of that primitive (since, at this stage, it may not yet be known if one or more fragment processing steps need not be performed in respect of that primitive).

In embodiments, the metadata stored for a (and, e.g., each) primitive may further comprise an identifier for that primitive. Any desired and suitable form of primitive identifier may be used for this purpose, e.g. any form of primitive identifier conventionally used by processing stages (e.g. rasterisers) of graphics processing systems when handling primitives.

In embodiments, the metadata stored for a (and, e.g., each) primitive may further comprise a valid indicator (bit) (e.g. a "valid flag") that indicates whether or not that metadata comprises data for a valid primitive (e.g. a primitive currently being processed (e.g. rasterised and/or rendered) by the graphics processing system). The valid indicator stored for a (and, e.g., each) primitive may, at least when the primitive is initially received, be set to indicate that the metadata comprises data for a valid primitive. Then, when a (and, e.g., each) primitive is invalidated (e.g. when that primitive is no longer being processed (e.g. rasterised and/or rendered) by the graphics processing system, for example because that primitive or its fragments have been discarded and/or processing of that primitive or its fragments is complete), the valid indicator for the primitive may be set to indicate that the metadata comprises data for an invalid primitive.

As discussed above, in embodiments, a fragment tracking record may be provided that stores one or more (and typically plural) sets of such metadata respectively for one or more (and typically plural) received primitives.

Thus, in embodiments, when determining whether a subsequently received primitive to be rasterised suitably covers the previously received primitive such that one or more fragment processing steps need not be performed in respect of the previously received primitive, the one or more earlier stages may search though one or more (and typically plural) sets of metadata stored respectively for one or more (and typically plural) previously received primitives, e.g. that are stored in the fragment tracking record, to determine whether one or more previously received primitives are suitably covered by the subsequently received primitive to be rasterised, e.g. to identify and indicate one or more previously received primitives for which some or all of the fragment processing need not be performed.

This search may, for example, be conducted sequentially (e.g. backwards) though the one or more sets of metadata stored for the one or more previously received primitives (e.g. in an opposite order to the order in which the primitives were received by the one or more earlier stages and, e.g., in an opposite order to the order in which the primitives were included in the fragment tracking record). The search may be terminated when it is determined that at least one of the previously received primitives is not suitably covered by the subsequently received primitive to be rasterised, e.g. when at least one "un-killable" previously received primitive is identified for which fragment processing must be performed. These embodiments can, for example, help to avoid inadvertently discarding or "killing" fragments for one or more primitives that were received even earlier than the at least one "un-killable" previously received primitive, and that might otherwise be determined as being suitably covered by the subsequently received primitive to be rasterised, but that still need be processed (e.g. because those one or more even earlier primitives may impact on the processing of the at least one "un-killable" previously received primitive).

As discussed above, the metadata stored for a (and, e.g., each) primitive may comprise an identifier for that primitive. In embodiments, when querying the metadata stored for the previously received primitive to determine whether one or more fragment processing steps need not be performed in respect of the previously received primitive, the one or more later stages may query the sets of metadata, e.g. that are stored in the fragment tracking record, using the primitive identifier for the previously received primitive to locate the set of metadata associated with the previously received primitive.

Similarly, in embodiments, when a (and e.g. each) primitive is invalidated (e.g. is no longer being processed (rasterised and/or rendered) by the graphics processing system), the graphics processing system may search through the sets of metadata, e.g. that are stored in the fragment tracking record, using the primitive identifier for the invalidated primitive to locate the metadata associated with the invalidated primitive. The valid indicator for the invalidated primitive can then be set accordingly to indicate that the metadata comprises data for an invalid primitive.

In embodiments, for the purposes of generating the render output, the render output may be divided into a plurality of regions or "patches" (e.g. tiles). Embodiments may further comprise the one or more earlier stages (e.g. the rasteriser) testing a region or "patch" of the render output against a (and, e.g., each) received primitive (e.g. the subsequently and/or the previously received primitive) to be rasterised to determine if the received primitive to be rasterised completely covers the patch of the render output.

When it is determined that a subsequently received primitive to be rasterised completely covers the patch of the render output (and, e.g. in response to that determination), the one or more earlier stages may perform one or more additional steps to determine whether the subsequently received primitive to be rasterised suitably covers a previously received primitive over that patch, and (e.g. depending on the results of the one or more additional steps) may indicate that one or more fragment processing steps need not be performed in respect of the previously received primitive over that patch. This can, for example, provide an efficient way for larger regions (e.g. up to the size of the patch (e.g. tile)) of fragments for the previously received primitive to be potentially marked for discarding or killing in view of the subsequently received primitive.

Conversely, when it is determined that a subsequently received primitive to be rasterised does not completely cover the patch of the render output, the one or more earlier stages may not perform one or more additional steps to determine whether the subsequently received primitive to be rasterised suitably covers the previously received primitive over that patch, and may not indicate that one or more fragment processing steps need not be performed in respect of a previously received primitive over that patch. This can, for example, avoid the need to perform such additional steps and/or to search through the sets of metadata, e.g. that are stored in the fragment tracking record, in respect of subsequently received primitives that are less likely to suitably cover previously received primitives.

The one or more additional steps to determine whether the subsequently received primitive to be rasterised suitably covers the previously received primitive may comprise determining whether or not the subsequently received primitive and the previously received primitive affect (e.g. write to one or more buffers comprising) the same type of fragment data (e.g. depth, colour, transparency, etc.) and/or same render target as each other.

Embodiments may also or instead comprise the one or more earlier stages testing a region or "patch" of the render output against a (and, e.g., each) received primitive (e.g. the subsequently and/or the previously received primitive) to be rasterised to determine if the received primitive to be rasterised at least partially covers the patch of the render output.

In embodiments, when it is determined that the received primitive to be rasterised does not even at least partially cover the patch of the render output, the one or more earlier stages may discard that received primitive from further processing in respect of the patch (however, that patch may, and will usually, be considered again for one or more other primitives and/or the received primitive may be considered again for one or more other regions or patches). Discarding (culling) the received primitive from further processing in respect of the patch may comprise not generating fragments corresponding to that patch and/or not outputting fragments corresponding to that patch from the one or more earlier stages in respect of the primitive. These embodiments can allow, for example, for the received primitive to be discarded or "culled" from further consideration in respect of a patch of the render output at an early stage in the rasterisation process (i.e. when the patch is determined as not being even at least partially covered by the primitive).

In this regard, the Applicants have further developed a "hierarchical" rasterisation arrangement, in which primitives may be iteratively tested against progressively smaller regions or "sub-patches" of the render output (and thus, correspondingly, patches of sampling positions (and patches of fragments)).

In these arrangements, a primitive to be rasterised may first be tested against a larger patch (e.g. a frame or tile in a tile-based graphics processing system) of the render output, to determine if the primitive covers (at least in part) the larger patch (e.g. covers any smaller patches of the render output that the larger patch encompasses). When the primitive does cover (at least in part) the larger patch (e.g. does cover (at least in part) any smaller patches of the render output that the larger patch encompasses), then the larger patch may be sub-divided into smaller patches, and the process may then be repeated for each smaller patch of the render output (e.g. that was found to be at least partially covered by the primitive), until a minimum or smallest patch size is reached. The smallest patch may then be sample tested to determine which sampling points and thus fragments for that patch are covered by the primitive. Covered fragments may then be generated by the one or more earlier stages for further processing by the graphics processing system. This hierarchical consideration of patches in relation to primitives can allow the one or more earlier stages to process primitives in a highly efficient manner.

Thus, in embodiments, for the purposes of generating the render output, the render output may be divided into a plurality of larger patches, with each larger patch of the render output encompassing a set of plural smaller patches of the render output. Embodiments may then comprise the one or more earlier stages testing a larger patch of the render output against a (and, e.g., each) received primitive (e.g. the subsequently and/or the previously received primitive) to be rasterised to determine if the received primitive to be rasterised at least partially covers the larger patch of the render output.

When it is determined that the received primitive to be rasterised does not at least partially cover the larger patch of the render output (e.g. does not at least partially cover any smaller patches of the render output that the larger patch encompasses), the one or more earlier stages may discard the received primitive to be rasterised from further processing in respect of the larger patch (however, as discussed above, that larger patch region may, and will usually, be considered again for one or more other primitives and/or the received primitive may be considered again for one or more other larger patches). Again, discarding (culling) the received primitive from further processing in respect of the larger patch may comprise not generating fragments corresponding to that larger patch and/or not outputting fragments corresponding to that larger patch from the one or more earlier stages in respect of the primitive. This can, for example, help to avoid the graphics processing system wasting further processing resources on processing fragments corresponding to that larger patch in respect of the received primitive.

Conversely, when it is determined that the received primitive to be rasterised at least partially covers the larger patch of the render output (e.g. at least partially cover one or more of the smaller patches of the render output that the larger patch encompasses), the one or more earlier stages may sub-divide the larger patch into plural smaller patches of the render output and test at least one of the smaller patches of the render output against the received primitive to be rasterised to determine if the received primitive to be rasterised at least partially or completely covers the at least one smaller patch of the render output, for example in manner and/or for the purposes as discussed above.

This process may be repeated at one or more lower levels of the patch hierarchy, as desired.

When a smaller or smallest patch is reached, the one or more earlier stages may generate a set of one or more graphics fragments from that smaller or smallest patch. Generating the set of one or more graphics fragments from a patch may comprise the one or more earlier stages determining which sampling point positions for a set of graphics fragments corresponding to that patch are actually covered by the received primitive to be rasterised and generating one or more graphics fragments (and, e.g., one or more coverage (bit) masks) accordingly.

However, in other embodiments, a hierarchical patch sub-division process may not be used, e.g. when it is determined that the received primitive to be rasterised completely covers a larger or largest patch of the render output. In this case, the one or more earlier stages may directly generate a set of graphics fragments from the received primitive in respect of the patch. In this case, generating the set of graphics fragments in respect of the patch may not comprise a further step of the one or more earlier stages determining which sampling point positions for a set of graphics fragments corresponding to that patch are actually covered by the received primitive to be rasterised (since it will generally already be known that all of the sampling point positions for the set of graphics fragments corresponding to that patch are implicitly covered). The one or more earlier stages may also accordingly generate one or more (fully covered) coverage (bit) masks.

Thus, in embodiments, a set of one or more (e.g. covered) graphics fragments may be generated by the one or more earlier stages (e.g. the rasteriser) for a primitive, e.g. that at least partially or completely covers a patch of the render output. The one or more earlier stages (e.g. the rasteriser) may store the set of (e.g. covered) graphics fragments in an output buffer, e.g. prior to those graphics fragments (if not discarded or killed in view of a subsequently received primitive) being issued to one or more even later stages of the graphics processing system.

Each fragment may comprise data for a set of one or more sampling points covered by a primitive. Each fragment may represent (have associated with it) a single sampling point, or a set of plural sampling points, as desired. A fragment may accordingly be tested for primitive coverage using any desired and suitable number of sampling points. For example, a fragment may be tested using only one sampling point (for single-sampled mode) or may be tested using a set of plural (e.g. 4) sampling points (for multi-sampled mode, e.g. for antialiasing purposes).

Each fragment may further comprise a primitive identifier (e.g. as discussed above) for the primitive that is determined as covering the one or more sampling points in question. This can allow the one or more later stages of the graphics processing system to query the relevant metadata, e.g. that is stored in the fragment tracking record, by using the primitive identifier for the particular primitive indicated for the fragment in question.

A or each sampling point may be applied in respect of the fragment with any desired and suitable offset from an (e.g. x, y) position in the render output corresponding to the fragment. Also, when multi-sampled mode is used, plural sampling points may be applied in respect of the fragment with any desired and suitable sampling point pattern, such as a (4×) ordered grid or (4×) rotated grid.

A primitive to be rasterised in the technology described herein may comprise any desired and suitable polygon that can be processed for a render output, such as a triangle or quadrilateral. The primitive may be defined by and represented as a set of vertices. Each vertex for a primitive may have associated with it a set of data (such as position, colour, texture and/or other attributes data) representing the vertex.

The render output to be generated, and which may be divided into regions or patches, may comprise any desired and suitable render output that is to be generated by the graphics processing system (pipeline). Thus, it may comprise, for example, a tile to be generated in a tile-based graphics processing system (pipeline) and/or a frame (e.g. an image or a texture) of output fragment data.

The regions or patches that the render output may be divided into can also take any desired and suitable form. Each patch, e.g. within a given hierarchical level of patches, may represent a respective distinct area of the render output to be generated. Each smaller patch within a given lower hierarchical level of patches may represent a respective distinct sub-area of the area represented by a larger patch within a given higher hierarchical level.

The render output may be divided into at least (but typically more than) one level of regions or patches, such as at least (but typically more than) two hierarchical levels of patches. For example, the render output may be divided into a plurality of first level ("higher level" or "highest level") patches. Each of these first level patches may then encompass a set of smaller second level ("lower level") patches. Each of these second level patches may then encompass a set of even smaller third level ("even lower level") patches, and so on as desired. For example, each of these third level patches may then encompass a set of even smaller fourth level ("lowest level") patches. In embodiments, there may be any number of hierarchical levels of patches. In some embodiments, there may be four hierarchical levels of patches. Each of the regions or largest patches may comprise an entire frame or tile of a tile-based graphics processing system.

The regions or patches that the render output may be divided into may all have the same shape. Each patch that the render output may be divided into may be a regularly shaped area of the render output. The regions or patches may be rectangular (including square). In embodiments, all the patches at a given hierarchical level may have the same size, and may also the same shape, as each other (and may cover the same number of sampling positions of the render output).

The respective sets of plural smaller patches of the render output that each larger patch of the render output may be sub-divided into (encompass) may contain any desired (plural) number of smaller patches of the render output. Each set of plural smaller patches that a given larger, higher level patch encompasses may comprise an integer number of plural smaller patches. In embodiments, each larger patch may be sub-divided into (encompass) a set of four smaller patches. Each larger patch may be sub-divided into (encompass) a 2×2 set (array) of smaller patches.

Thus, in embodiments, the patches may be arranged such that a (and each) larger patch encompasses (and may accordingly be sub-divided into) a set of four smaller patches, with each smaller patch being a quarter of the size of the larger patch. Varying the patch sizes by a factor of 4 in each successive sub-division level is a particularly convenient arrangement for progressively decreasing the patch size as the process proceeds. However, it is not essential and other arrangements could be used if desired.

The regions or patches may each correspond to a plurality of sampling positions of the render output to be generated. There may be any desired and suitable correspondence between sampling positions and output positions (e.g. pixels or texels) in the render output (e.g. frame, image or texture). For example, there may be a one to one mapping, a plural to one mapping, or a one to plural mapping, between sampling positions and output positions. Each sampling position may correspond to (only) one (potential) graphics fragment. Each graphics fragment may be (potentially) generated by testing for primitive coverage at one or more sampling point positions.

Each patch of the render output that is tested may correspond to an integer number of (potential) fragments, such as 64×64, 32×32, 16×16, 8×8, 4×4 and/or 2×2 fragments. In some embodiments, the largest patches may each correspond to 16×16 fragments, with the next smaller second level patches corresponding to 8×8 fragments, and the third level, even smaller patches corresponding to 4×4 fragments. The smallest, fourth level, patches may correspond to 2×2 fragments. In other embodiments, the largest patches may each correspond to 64×64, 32×32, 8×8 or 4×4 fragments.

It should be noted here that the terms "larger" and "smaller" used herein refer only to the relative sizes of the particular patches. In embodiments, the "larger" patch of the render output may correspond to the largest size of patch that the render output is divided into. However, the "larger" patch could instead be a patch other than a patch of the set of the largest patches that the render output is divided into. It is only required that the larger patch is not a patch from the set of the smallest level of patches that the render output is sub-divided into. Likewise, the "smaller" patch could be from any particular level of patches, so long as it is from a level of patches that is smaller than the level of patches of the "larger" patch.

As discussed above, the one or more earlier stages (e.g. the rasteriser) test a patch of the render output against a primitive to be rasterised to determine if the primitive to be rasterised at least partially or completely covers the patch of the render output, i.e. performs a primitive coverage test in respect of the patch. The one or more earlier stages can test a particular patch of the render output against a particular primitive to determine if the primitive at least partially or completely covers the patch in any desired and suitable manner.

For example, the one or more earlier stages may test each edge of the primitive against the particular patch. These edge tests may be performed, for example, by deriving (line) equations representing each of the edges of the primitive, and testing these edge equations against patch testing points of the patch. For example, a pattern or grid of patch testing points may be derived for the patch (and for each patch) being tested, and those patch testing points then used with (line) equations representing the edges of the primitive in question to determine if the patch is at least partially covered by the primitive.

A patch to be tested may comprise any desired and suitable number of patch testing points. For example, a patch to be tested may comprise plural (e.g. 9 or 16) patch testing points. The patch testing points may also be applied in any desired and suitable pattern. For example, the patch testing points may be provided at or towards respective corners of the smaller patches that the larger patch encompasses. One or more of the sampling points for the fragments corresponding to the patch (e.g. one or more or all of sampling points for the corner fragments of the smaller patches that the larger patch encompasses) may be used as the patch testing points.

In embodiments, the one or more earlier stages (e.g. the rasteriser) may determine whether a particular patch is at least partially covered by a primitive, by one or more or all of: determining whether one or more patch testing points are within the edges of the primitive; determining whether edges of the patch are crossed by edges of the primitive; determining whether the vertices of the primitive are within the edges of the patch; determining whether the vertices of the primitive lie on the edges of the patch. Each edge of a patch may be defined by two or more (e.g. corner) patch testing points.

In embodiments, the one or more earlier stages may determine that a particular patch of the render output is at least partially covered by a primitive if at least one of the following conditions is met: at least one patch testing point is within the edges of the primitive; at least one edge of the patch is crossed by an edge of the primitive; at least one vertex of the primitive is within the edges of the patch; or at least one vertex of the primitive is on a patch edge and, if the vertex is on the patch edge, another vertex of the primitive is on another edge of the patch, or if the vertex is on a corner of the patch, another vertex is on the opposite corner or on one of the opposite edges of the patch.

In some embodiments, the one or more earlier stages may determine that a larger patch of the render output is at least partially covered by a primitive if at least one of its smaller patches is at least partially covered by a primitive (e.g. using the above conditions). However, in other embodiments, the one or more earlier stages may determine that a patch of the render output is at least partially covered by a primitive (e.g. using the above conditions) without reference to smaller patches.

In embodiments, the one or more earlier stages may test a particular patch of the render output against a primitive to determine if the primitive completely covers the patch. This can be determined in any desired and suitable manner. In embodiments, a primitive may be determined to completely cover a particular patch if all of the patch testing points for that patch are within or lie on the edges of the primitive.

In some embodiments, the one or more earlier stages may determine that a larger patch of the render output is completely covered by a primitive all of its smaller patches are completely covered by a primitive (e.g. using the above condition). However, in other embodiments, the one or more earlier stages may determine that a patch of the render output is completely covered by a primitive (e.g. using the above condition) without reference to smaller patches.

Other forms of primitive coverage test may be used as desired.

As discussed above, testing a patch of the render output against a primitive to be rasterised may further comprise one or more additional tests (i.e. in addition to a primitive coverage test as described above). For example, testing a patch of the render output against a primitive to be rasterised may further comprise an initial or "hierarchical" depth and/or stencil test.

Performing an initial depth and/or stencil test for a subsequently received primitive in respect of a particular patch can allow the system to determine whether or not the subsequently received primitive is occluded by or will overdraw a previously received primitive over that particular patch. As will be understood, performing an initial depth and/or stencil test for a subsequently received primitive in respect of a particular patch allows the one or more earlier stages to (potentially) cull the subsequently received primitive in respect of that patch, e.g. when the depth values relating to that subsequently received primitive are found to fail the depth test against the depth values for the previously received primitive in respect of that patch (i.e. if the primitive is found to be occluded by another primitive over that patch).

Thus, when a subsequently received primitive (completely) fails the initial depth and/or stencil test in respect of a patch (such that that primitive will be overdrawn and thus not visible in the render output), fragments may not be output from the one or more earlier stages in respect of that primitive (even if that patch is determined as being at least partially covered by the primitive). Conversely, when a subsequently received primitive (completely) passes the initial depth and/or stencil test in respect of a patch (such that that primitive may be visible in the render output), fragments may be generated and output from the one or more earlier stages in respect of that primitive as discussed above.

Similarly, performing an initial depth and/or stencil test for a subsequently received primitive in respect of a particular patch can allow the system to (potentially) determine and indicate that one or more fragment processing steps need not be performed in respect of a previously received primitive, e.g. when (and only when) the depth values relating to that subsequently received primitive are found to (completely) pass the depth test against the depth values for the previously received primitive in respect of that patch (i.e. when (and only when) the previously received primitive is found to be occluded by the subsequently received primitive over that patch).

Thus, when a subsequently received primitive (completely) passes the initial depth and/or stencil test in respect of a patch (such that that primitive may be visible in the render output), the one or more earlier stages may perform one or more additional steps to determine whether the subsequently received primitive to be rasterised suitably covers the previously received primitive such that one or more fragment processing steps need not be performed in respect of the previously received primitive, and (e.g. depending on the results of the one or more additional steps) may indicate that one or more fragment processing steps need not be performed in respect of the previously received primitive, for example as discussed above.

Conversely, when a subsequently received primitive (completely) fails the initial depth and/or stencil test in respect of a patch (such that that primitive will be overdrawn and thus not visible in the render output), the one or more earlier stages may not perform one or more additional steps to determine whether the subsequently received primitive to be rasterised suitably covers the previously received primitive such that one or more fragment processing steps need not be performed in respect of the previously received primitive, and may not indicate that one or more fragment processing steps need not be performed in respect of the previously received primitive, for example as discussed above.

As discussed above, the one or more additional steps to determine whether the subsequently received primitive to be rasterised suitably covers the previously received primitive may comprise determining whether or not the subsequently received primitive and the previously received primitive affect (e.g. write to one or more buffers comprising) the same type of fragment data (e.g. depth, colour, transparency, etc.) and/or same render target as each other.

When the result of the hierarchical depth and/or stencil test for a patch in respect of a primitive is inconclusive (such that that primitive may or may not be visible or may be only partially visible in the render output), the patch may be sub-divided into a set of plural smaller patches of the render output as discussed above (even if that patch is determined as being completely covered by the primitive). This is because further consideration of the patch at a lower level of sub-division is likely to be desirable.

Depth data that is representative of one or more primitives in respect of a patch may accordingly be used and/or stored (and/or updated following an initial depth test). The depth data may comprise any suitable data (e.g. a depth range (minimum and maximum depths) for a patch or primitive and/or a depth (e.g. testing point or vertex) value or values for a patch or primitive and/or a depth function (e.g. coefficients for a plane equation) for a primitive) that is representative of the depth of one or more primitives in respect of a patch.

The depth and/or stencil data may be stored in any desired and suitable storage that is able to be accessed by the one or more earlier stages. The storage may be dedicated storage for the purpose of storing depth and/or stencil data, or it may be part of storage that is used to store other data in addition to the depth and/or stencil data. The storage may be any desired and suitable data storage, such as, e.g., a register or registers, a buffer or buffers, a cache or caches, main memory, etc.

When depth data relating to a previously received primitive has been stored, the one or more earlier stages may use this stored depth data to then perform an initial depth test for a patch in respect of a subsequently received primitive. Thus, in embodiments of the technology described herein, depth data relating to a previously received primitive may be used to perform an initial depth test for a patch in respect of a subsequently received primitive that at least partially covers that patch. In embodiments, the depth test for a particular patch may be performed by comparing depth range values relating to the previously received primitive over that patch to depth range values relating to the subsequently received primitive over that particular patch.

After performing the initial depth test for a patch that was found to be at least partially covered by the subsequently received primitive, the one or more earlier stages may store depth data for that patch, based on the result of the initial depth test performed in respect of that patch. The depth data that is stored for the patch may comprise depth data relating to the previously received primitive, or depth data relating to the subsequently received primitive, or a combination thereof.

It should be noted here that the terms "previously received primitive" and "subsequently received primitive" used herein refer only to the order of the primitives as they are processed by the one or more earlier stages in relation to each other. Thus, for example, it should be understood that the previously received primitive as described herein need not be the very first primitive that is processed by the one or more earlier stages for the render output (e.g. frame) (although it may so happen to be). Correspondingly, the subsequently received primitive as described herein need not be the second primitive that is processed by the one or more earlier stages for the render output. Rather, the previously received primitive is processed by the one or more earlier stages prior to processing the subsequently received primitive. It should also be understood that the subsequently received primitive need not necessarily be processed directly (immediately) after the previously received primitive. For example, one or more other primitives may be processed by the one or more earlier stages in between the previously received and subsequently received primitives, i.e. after the previously received primitive is processed but before the subsequently received primitive is processed.

As will be appreciated, embodiments of the technology described herein may be performed in respect of each one of plural primitives, e.g. that potentially at least partially cover a region or larger patch (e.g. tile) making up the render output. As will also be appreciated, embodiments of the technology described herein may also be performed in respect of each one of plural regions (e.g. tiles) or larger patches that make up the render output.

The technology described herein can be used irrespective of the form of output that the graphics processing system may be providing. Thus, for example, it may be used where the render output is intended to form an image (a frame) for display (e.g. on a screen or printer). However, the technology described herein may also be used where the render output is not intended for display, for example where the render output is a texture that the graphics processing system is being used to generate (e.g. in "render to texture" operation), or, indeed, where the output the graphics processing system is being used to generate is any other form of data array.

The technology described herein is applicable to any suitable form or configuration of graphics processing system, graphics processor, and renderer, such as one having a "pipelined" arrangement. The technology described herein is particularly applicable to tile-based graphics processors and graphics processing systems, and to multi-core graphics processing systems. Thus, in embodiments, the graphics processing system may be a tile-based graphics processing system. Similarly, in embodiments, the graphics processing system may be a multi-core system (i.e. that includes plural graphics processing cores).

The technology described herein accordingly extends to, and may comprise, a graphics processor including a graphics processing pipeline operable, and/or operated, in accordance with the method of any one or more of the embodiments of the technology described herein described herein. Subject to any hardware necessary to carry out the specific functions discussed above, such a graphics processor can otherwise include any one or more or all of the usual functional units, etc., that graphics processors include.

The graphics processing system and pipeline can contain any suitable and desired processing stages, etc., that graphics processing systems and pipelines normally include. Thus, for example, it may include one or more of all of: a rasteriser, a renderer (e.g. in the form of a fragment shader), (early and/or late) depth and/or stencil testing stages (tester), a blender, a write-out unit, etc.

The various stages of the system and/or pipeline may be implemented as desired, e.g. in the form of one or more fixed-function units (hardware (circuitry/circuits)) (i.e. that is dedicated to one or more functions that cannot be changed), or as one or more programmable processing stages, e.g. by means of programmable circuitry/circuits that can be programmed to perform the desired operation. There may be both fixed function and programmable stages.

One or more of the various stages may be provided as separate circuit elements to one another. Additionally or alternatively, some or all of the stages may be at least partially formed of shared circuitry (circuits).

In the case of a tile-based (tiling) graphics processing system, the pipeline may also comprise a tile buffer for storing tile sample values (rendered fragment data) and/or a write out unit that operates to write the data in the tile buffer (e.g. once the data in the tile buffer is complete) out to external (main) memory (e.g. to a frame buffer).

In embodiments, the various functions of the technology described herein may be carried out on a single graphics processing platform that generates and outputs the rendered fragment data that is, e.g., written to a frame buffer for a display device.

In some embodiments, the system, pipeline, etc., comprises, and/or is in communication with, one or more memories and/or memory devices that store the data described herein, and/or store software for performing the processes described herein. The system, pipeline, etc., may also be in communication with a host micro-processor, and/or with a display for displaying images based on the data generated by the graphics processing system.

The technology described herein can be implemented in any suitable system, such as a suitably configured microprocessor based system. In embodiments, the technology described herein may be implemented in a computer and/or micro-processor based system.

The various functions of the technology described herein can be carried out in any desired and suitable manner. For example, the functions of the technology described herein can be implemented in hardware or software, as desired. Thus, for example, the various functional elements, processing stages, and "means" of the technology described herein may comprise a suitable processor or processors, controller or controllers, functional units, circuitry, processing logic, microprocessor arrangements, etc., that are operable to perform the various functions, etc., such as appropriately configured dedicated hardware elements or processing circuitry and/or programmable hardware elements or processing circuitry that can be programmed to operate in the desired manner.

It should also be noted here that the various functions, etc., of the technology described herein may be duplicated and/or carried out in parallel on a given processor. Equally, the various processing stages may share processing circuitry, etc., if desired.

It will also be appreciated that all of the described embodiments of the technology described herein can include, as appropriate, any one or more or all of the optional features described herein.

The methods in accordance with the technology described herein may be implemented at least partially using software e.g. computer programs. It will thus be seen that further embodiments of the technology described herein comprise computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or microprocessor system comprising data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

Not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

As discussed above, the technology described herein relates to arrangements in which a graphics processing system stores metadata relating to one or more previously received primitives. The metadata can indicate that one or more previously received primitives are suitably covered by (e.g. will have their data overwritten by) a subsequently received primitive. The metadata stored for the one or more previously received primitives can then later be queried by one or more later stages of the graphics processing system to determine whether one or more fragments for those one or more previously received primitives can be at least partially discarded or "killed". The system can provide an efficient way to reduce the amount of further processing of fragments for one or more previously received primitives that are later found by one or more earlier stages to be suitably covered by a subsequently received primitive.

FIG. 1 shows schematically a graphics processor 100 of a graphics processing system that implements a graphics processing pipeline that can be operated in accordance with the technology described herein.

FIG. 1 shows the main elements and pipeline stages of a graphics processor 100 that are relevant to the operation of the present embodiment. As will be appreciated, there may be other elements of the graphics processor 100 that are not illustrated in FIG. 1. It should also be noted here that FIG. 1 is only schematic, and that, for example, in practice the shown pipeline stages may share significant hardware circuits, even though they are shown schematically as separate stages in FIG. 1. It will also be appreciated that each of the stages, etc., of the graphics processor 100 as shown in FIG. 1 may be implemented as desired and will accordingly comprise, e.g., appropriate circuitry and/or processing logic, etc., for performing the necessary operation and functions.

The graphics processing system of FIG. 1 is a tile-based system. The graphics processor 100 will thus produce tiles of a render output data array, such as an output frame to be generated. However, the technology described herein is equally applicable to other systems, such as immediate mode rendering systems. The render output data array may be an output frame intended for display on a display device, such as a screen or printer, but may also, for example, comprise a "render to texture" output of the graphics processor, etc.

FIG. 1 shows schematically the pipeline stages after the graphics primitives (polygons) 102 for input to the rasterisation process have been generated. Thus, at this point the graphics data (the vertex data) has undergone transformation and lighting operations (not shown), and a primitive set-up stage (not shown) has set-up the primitives 102 to be rendered in response to the commands and vertex data provided to the graphics processor 100.

As shown in FIG. 1, this part of the fragment processing pipeline of the graphics processor 100 includes a number of processing stages, including a rasteriser 104, an early depth and stencil (ZS) test stage 106, a rendering stage in the form of a fragment shading pipeline stage 108, and a late depth and stencil (ZS) test stage 110. The pipeline also includes and/or has access to (is in communication with) appropriate memory for storing the data that the pipeline will use and/or generate, such as initial or "hierarchical" depth and stencil (ZS) buffer(s) 112, depth and stencil (ZS) buffer(s) 114, tile buffer(s) 116, etc.

As will be appreciated, an "earlier" processing stage can refer to a processing stage that processes primitives and/or fragments for primitives prior to those primitives and/or fragments being subsequently processed by a "later" processing stage. Thus, the rasteriser 104 can be considered as being "earlier" in the pipeline and the remaining processing stages shown in FIG. 1 can be considered as being relatively "later" in the pipeline.

The rasteriser 104 can operate to rasterise primitives 102 making up the render output (e.g. the image to be displayed) into graphics fragments for processing. When doing this, the rasteriser 104 receives graphics primitives 102 to be rendered, and may rasterise primitives 102 to sampling points and generate graphics fragments having appropriate positions (representing appropriate sampling positions) for rendering the primitives 102.

In the present embodiment, each graphics fragment that can be generated in the graphics processing pipeline may have associated with it a single sampling point or plural (and typically four) sampling points. Other arrangements would be possible. When plural sampling points are used, each graphics fragment has associated with it a coverage bit mask indicating which sampling points of the plural sampling points that the fragment can represent, are actually being used when rendering the fragment (i.e. are actually covered by the primitive 102 in question).

In the present embodiment, the rasteriser 104 comprises a rasterisation stage 118 that can iteratively test primitives 102 against progressively smaller patches (regions) of the render output (target) area (and thus, correspondingly, patches of potential fragments), down to a minimum patch size corresponding, in the present embodiment, to a 2×2 group of potential fragments (a "quad"), discarding (culling) any patches that are not at least in part covered by the primitive 102. Thus, each patch that is tested corresponds to a set of potential fragments.

To perform primitive coverage testing, the rasterisation stage 118 initially receives the new input primitive 102 and selects a larger 16×16 patch (which, in the present embodiment, corresponds to the size of an entire tile). The rasterisation stage 118 then tests the larger patch against the edges of the input primitive 102 in question to determine if that input primitive 102 at least partially covers the larger patch (e.g. at least partially covers any patch of a 2×2 set of smaller patches of the render output that the larger patch can be sub-divided into (encompasses)).

The edges of the input primitive 102 are represented by appropriate line (edge) equations that have been derived from the vertices of the input primitive 102. A grid of patch testing points is derived for the patch (and for each patch) being tested. For example, a grid comprising 2×2 patch testing points may be used, with a patch testing point being provided adjacent to (e.g. at a sampling position for a fragment located at) each corner of the patch. The patch testing points are then used with the line equations representing the edges of the input primitive 102 in question to determine if the patch is at least partially covered by the input primitive 102.

In the present embodiment, the rasterisation stage 118 determines that a patch of the render output is at least partially covered by an input primitive 102 if at least one of the following conditions is met: at least one patch testing point is within the input primitive 102; at least one edge of the patch is crossed by an edge of the input primitive 102; at least one vertex of the input primitive 102 is within the patch; or at least one vertex of the input primitive 102 is at a patch edge and, if the vertex is at the patch edge, another vertex of the primitive 102 is at another edge of the patch, or if the vertex is at a corner of the patch, another vertex is at the opposite corner or at one of the opposite edges of the patch. In this embodiment, a larger patch is considered as being at least partially covered by an input primitive 102 when at least one of the smaller patches that are encompassed by the larger patch is determined as being at least partially covered by the input primitive 102 using the above conditions.

In this embodiment, the rasterisation stage 118 also determines whether a patch of the render output is completely covered by an input primitive 102. In this embodiment, a patch can be determined as being completely covered by a primitive when the patch testing points are all found to be within the edges of the input primitive 102. In this embodiment, a larger patch is considered to be completely covered by an input primitive 102 when all of the smaller patches that are encompassed by the larger patch are determined as being completely covered by the input primitive 102 using the above condition.

Other forms of primitive coverage test may be used as desired.

If it is found that a patch is not covered by the input primitive 102 at all, then the patch is not processed further in respect of the input primitive 102 in question. However, another patch (tile) may later be selected and tested against the input primitive 102. Similarly, the region of the render output covered by the patch may be selected and tested as a new patch against a new input primitive.

If an input primitive 102 is found to at least partially cover a patch, then that patch is forwarded to a hierarchical depth and stencil (ZS) test stage 120 of the rasteriser 104 that can perform initial hierarchical depth and stencil tests on each of the patch considered by the rasteriser 104 to see if those patches can be culled. To do this, the hierarchical ZS test stage 120 performs an initial depth (Z) test on each at least partially covered patch to see if the patch can be discarded or "culled" at this stage. At the same time, an initial stencil (S) test is carried out.

The rasteriser 104 is accordingly in communication with hierarchical ZS buffer(s) 112. The hierarchical ZS buffer(s) 112 can store depth data (such as a range of depth values and/or depth function data) and a stencil value for each patch size and position that the buffer represents (essentially for each patch size and position that the rasteriser 104 could consider for the tile that is being processed).

In the present embodiment, the hierarchical ZS test stage 120 performs a hierarchical depth test on a patch, using a depth value range representative of the primitive 102 that at least partially covers that patch, by taking appropriate depth samples for the patch in respect of the primitive, and comparing the depth samples for the patch with the depth range data already stored in the corresponding entry for that patch position, to try to determine whether that patch will be occluded by or will overdraw other fragments and sampling points to be rendered. If the patch passes the hierarchical depth test, then the depth value ranges stored in that entry of the hierarchical ZS buffer(s) 112 are updated accordingly.

The present embodiment supports four levels of sub-division (three sub-division iterations) and starts with larger patches corresponding to 16×16 potential fragments, which are then (if appropriate) sub-divided into four smaller 8×8 fragment patches. Each of those 8×8 fragment patches is then (if appropriate) sub-divided into four even smaller 4×4 fragment patches. Finally, each of those 4×4 fragment patches is then (if appropriate) sub-divided into four even smaller 2×2 fragment patches. As in the present embodiment, a 2×2 fragment patch is the minimum or smallest patch size that is used, the (potential) sub-division process stops at this point.

Figure 2A:
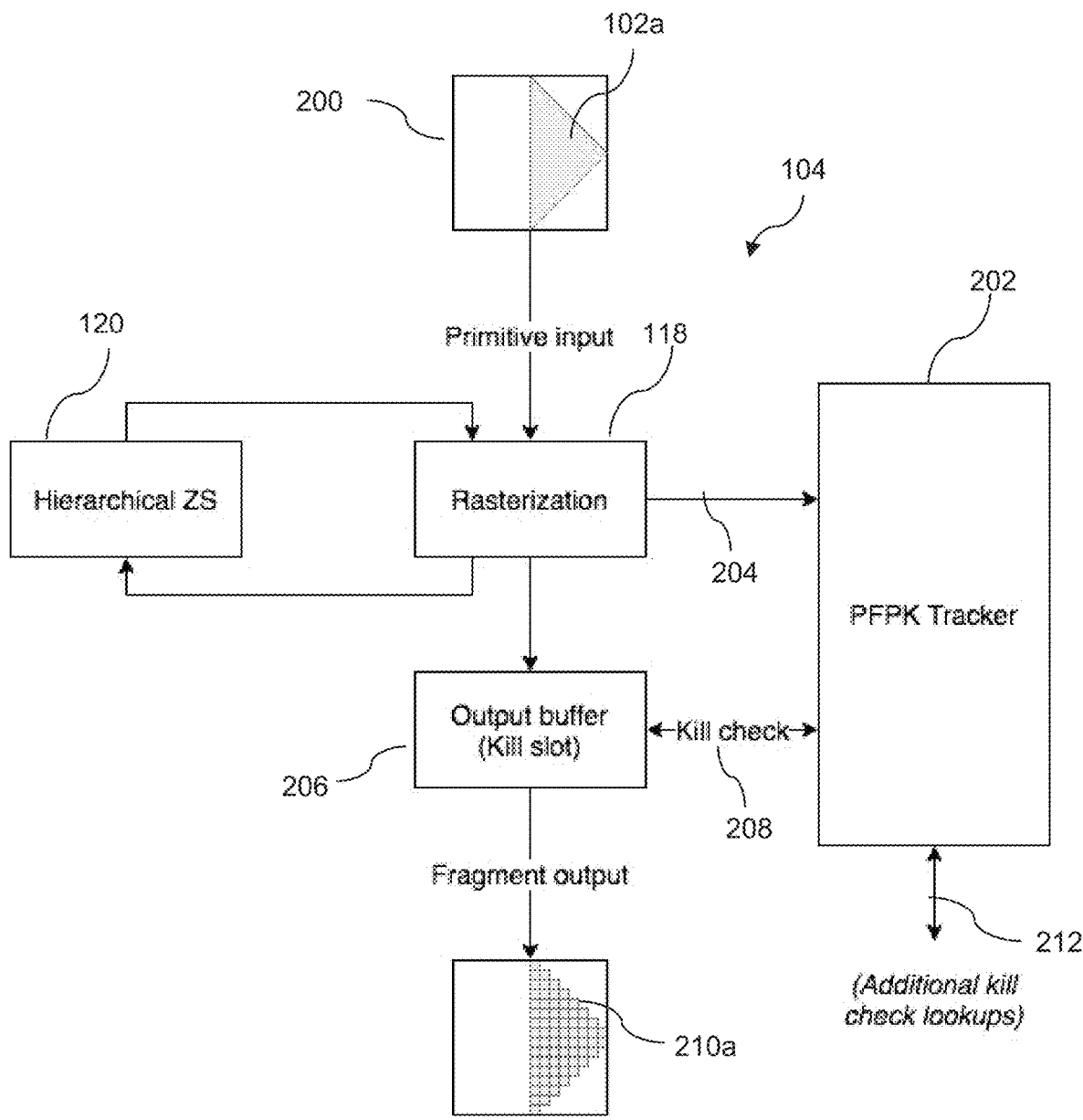
FIGS. 2A and 2B show schematically and in more detail processing stages of a rasteriser of a graphics processing system that can be operated in accordance with the technology described herein.
Figure 2B:
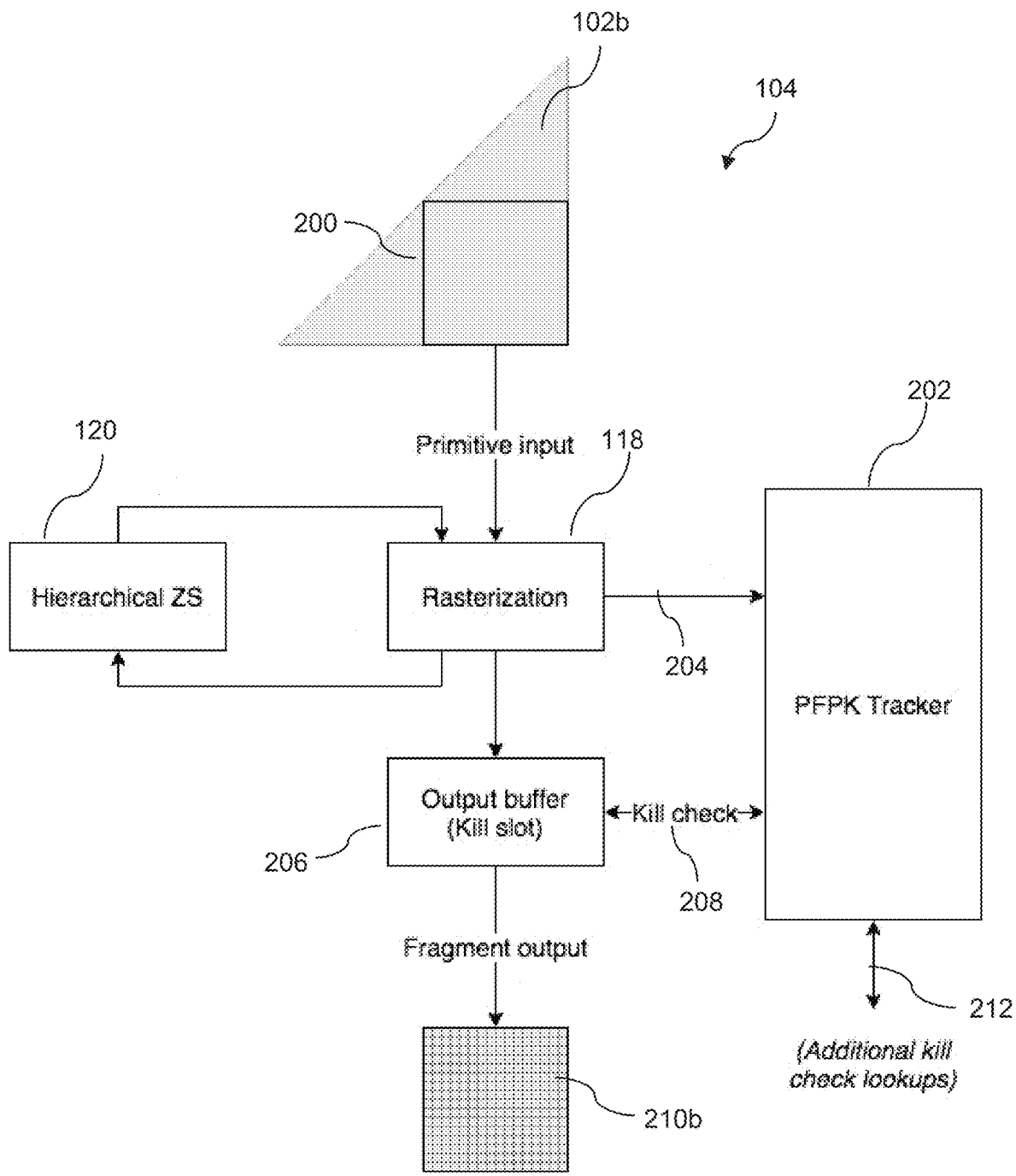

FIGS. 2A and 2B show the primitive processing stages for implementing the rasteriser 104 of the present embodiment in more detail. FIG. 2A illustrates the processing of a smaller primitive 102a that does not completely cover a larger patch, in this case a tile 200, of the render output (frame), whereas FIG. 2B illustrates the processing of a larger primitive 102b that does completely cover the tile 200 of the render output (frame).

As shown in FIGS. 2A and 2B, the rasterisation stage 118 can receive an input primitive 102 (e.g. either primitive 102a or 102b) and (if that primitive passes the coverage and hierarchical ZS testing discussed above) include the input primitive 102 in a fragment tracking record or "PFPK (Patch Forward Pixel Kill) tracker" 202 as illustrated by arrow 204. The graphics processing system maintains metadata for each primitive included in the fragment tracking record 202 that will be rasterised. The operation of the fragment tracking record 202 in this regard will be discussed in more detail below.

As discussed above, the rasterisation stage 118 can perform iterative hierarchical primitive coverage testing in respect of the input primitive 102. Thus, in this embodiment, if an input primitive 102 is found to at least partially cover a larger patch (as would be the case with both the smaller input primitive 102a and the larger input primitive 102b in respect of the tile 200), then the larger patch is forwarded to a hierarchical ZS test stage 120 to be tested with respect to data stored in the hierarchical ZS buffer(s) 112 as discussed above.

According to the outcome of the hierarchical depth and stencil tests performed by the hierarchical ZS test stage 120, the larger patch may be discarded by the rasterisation stage 118 and the primitive 102 not added to the fragment tracking record 202 (if entirely occluded) or sub-divided into its four smaller 8×8 patches by the rasterisation stage 118, with any surviving smaller 8×8 patches ("sub-patches") then being buffered by the rasterisation stage 118 to await further individual testing against the input primitive 102.

A smaller 8×8 patch generated by sub-division can then be selected by the rasterisation stage 118 and tested for coverage by the primitive 102. The smaller 8×8 patch can then either be discarded or passed to the hierarchical ZS test stage 120 depending on the results of a coverage test performed by the rasterisation stage 118. A smaller 8×8 patch that is passed to the hierarchical ZS test stage 120 can then either be discarded or sub-divided into a set of four even smaller 4×4 patches by rasterisation stage 118 depending on the results of the tests performed by the hierarchical ZS test stage 120, with any surviving even smaller 4×4 patches ("sub-patches") then being buffered by the rasterisation stage 118 to await further individual testing against the input primitive 102.

An even smaller 4×4 patch generated by sub-division can then be selected by the rasterisation stage 118 and tested for coverage by the primitive 102. The even smaller 4×4 patch can then either be discarded or passed to the hierarchical ZS test stage 120 depending on the results of a coverage test performed by rasterisation stage 118. An even smaller 4×4 patch that is passed to the hierarchical ZS test stage 120 can then either be discarded or sub-divided into a set of four of the smallest 2×2 patches by the rasterisation stage 118 depending on the results of the tests performed by the hierarchical ZS test stage 120, with any surviving even smaller 2×2 patches ("sub-patches") then being buffered by the rasterisation stage 118 to await further individual testing against the input primitive 102.

A smallest 2×2 patch generated by sub-division may then be selected by the rasterisation stage 118 and tested for coverage by the primitive 102. The individual sampling points of that patch that are covered by the primitive 102 are then used to generate fragments for rendering that correspond to, and indicate, the sampling points found to be covered by the primitive 102 (four fragments would be generated if all four of the 2×2 fragments in the minimum size patch are at least partially covered by the primitive 102).

However, in other embodiments, the process of iterative hierarchical sub-division may be skipped for a large patch that is completely covered by the primitive 102 (such as primitive 102b in respect of tile 200) and that completely passes the hierarchical depth and stencil tests. In this case, the rasterisation stage 118 may directly generate and output a set of fragments corresponding to the entire large patch without subdividing or further sample testing that larger patch.

The rasterisation stage 118 can also associate with each generated fragment, a coverage mask in the form of a bitmap that indicates, for each sampling point of the sampling point pattern used to generate the fragment, whether the corresponding sampling point is covered (i.e., in effect, whether the fragment is being used to render that sampling point (i.e. whether its data should be stored for that sampling point)).

The generated fragments are then passed to an output buffer 206. At this stage, a fragment discard check or "kill check" signal 208 can be sent between the output buffer 206 and the fragment tracking record 202 to determine if any fragments in the output buffer 206 for a particular primitive can be discarded or "killed" at this early stage, for example because data for those fragments will be overwritten by a subsequently received primitive that has since been input to the rasteriser 104. Again, the operation of the fragment tracking record 202 in this regard will be discussed in more detail below.

The generated fragments 210a, 210b that survive the kill check are then passed to the early ZS testing stage 106 shown in FIG. 1.

In the present embodiment, a bounding box is generated for each primitive 102 and a larger patch (tile) is tested against each primitive 102 that has a bounding box which at least partially covers that larger patch. Once all the primitives 102 have been processed by the rasteriser 104 for the larger patch area (tile), then the rasteriser 104 moves on to another larger patch area (tile) and so on, until all the primitives 102 for the desired render output have been processed.

The rasteriser 104 is thus configured in the present embodiment as a pipeline that can contain and process plural patches at the same time. The rasteriser 104 may also be configured to be able to generate plural fragments at a time (simultaneously) (e.g. where a primitive is found to cover plural sampling points of a patch of the render output). However, the fragments are still processed individually by the fragment processing stages of the pipeline, such as the early ZS testing stage 106, renderer (fragment shader) 108, and late ZS testing stage 110. Having the rasteriser 104 process plural patches in a pipeline manner and, in some cases, produce plural fragments simultaneously helps to create back pressure to thereby keep the rendering pipeline "filled up" with fragments. This also provides an opportunity to discard or "kill" one or more (e.g. up to a whole larger patch) of fragments at an early stage.

Other arrangements would be possible. For example, other embodiments are contemplated in which a non-hierarchical rasteriser is used. In these embodiments, the rasteriser may still perform primitive coverage testing and initial depth and/or stencil testing in respect of a region (e.g. tile) of the render output as discussed above, but without the capability to iteratively subdivide the region for further testing.

Referring again to FIG. 1, fragments issued (output) by the rasteriser 104 are then subject to an early depth and stencil test in the early ZS testing stage 106. This early ZS testing stage 106 performs depth and stencil tests on the individual (covered) sampling positions associated with the fragments issued by the rasteriser 104 (i.e. at per sampling point resolution).

To do this, the early ZS testing stage 106 uses per-sampling position depth and stencil values stored in the ZS buffers 114. Thus, the ZS buffers 114 store an appropriate depth (Z) value and stencil (S) value, respectively, for each sampling point that the buffer represents (essentially for each sampling point position of the tile that is being processed). These values are stored in the ZS buffers 114 when sampling points being tested by early ZS testing stage 106 and the late ZS testing stage 110 pass the respective depth and stencil tests (the stencil values can be stored/updated when the tests are failed as well).

The early ZS testing stage 106 is configured to operate in an appropriately conservative manner. Fragments that fail the early ZS testing stage 106 are culled by the early ZS testing stage 106. Fragments that pass the early ZS testing stage 106 (i.e. fragments having at least one associated covered sampling position that passes the early ZS testing stage 106) are then sent onwards to the fragment shading stage 108 (the renderer).

As with the output buffer 206, prior to performing one or more fragment processing (depth and/or stencil testing) operations on the fragments it receives, the early ZS testing stage 106 can send an additional fragment discard or "kill check" signal 212 to the fragment tracking record 202 to determine if any fragments for the primitive in question can be at least partially or completely discarded or "killed" at this stage, for example because data for those fragments will be overwritten by a subsequent primitive that has since been input to the rasteriser 104.

For example, the metadata for the primitive in question may indicate that the fragments of that primitive can be completely killed, and thus will not be ZS tested or sent onwards to the fragment shading stage 108 (the renderer). One example where this may occur is when the primitive in question has since been determined by the rasteriser 104 as being behind a completely opaque subsequent primitive that has since been processed by the rasteriser 104.

For another example, the metadata for the primitive in question may indicate that just the ZS testing and/or writing out the ZS test results for the fragments of that primitive can be skipped. The fragments of that primitive may, however, still be sent onwards to the fragment shading stage 108 (the renderer). This can help to reduce processing and bandwidth, but also allow those fragments to contribute to the shading of a sampling position. One example where this may occur is when the primitive in question has since been determined by the rasteriser 104 as being behind a semi-transparent subsequent primitive that has since been processed by the rasteriser 104. In this case, there would be no need to write the depth values for the primitive in question out to memory since they will be replaced by the depth values of the subsequent primitive, but the fragment data for the primitive in question may still need to be blended with the fragment data for the subsequent primitive.

It should be noted here that early ZS testing stage 106 may perform one or more fragment processing (depth and/or stencil testing) operations on each fragment it receives, and that a "kill check" may be performed prior to any one or more or all of these fragment processing (depth and/or stencil testing) operations, as desired. Thus, one or more "kill checks" may be performed by the early ZS testing stage 106 during the processing of a particular fragment.

The fragment shading stage 108 then performs the appropriate fragment processing (rendering) operations on the fragments it receives, so as to process the fragments to generate the appropriate fragment data, etc., for the render output (e.g. for display of the fragments).

This fragment processing may include any suitable and desired fragment shading processes, such as executing fragment shader programs on the fragments, applying textures to the fragments, applying blending, fogging or other operations to the fragments, etc., to generate the appropriate fragment data. In the present embodiment, the fragment shading stage 108 is in the form of a shader pipeline (a programmable fragment shader), but other arrangements, such as the use also or instead of fixed function fragment shading units would be possible, if desired.

Again, prior to performing one or more fragment processing (rendering) operations on the fragments it receives, the fragment shading stage 108 can send an additional fragment discard or "kill check" signal 212 to the fragment tracking record 202 to determine if any fragments for the primitive in question can be discarded or "killed" at this stage, for example because data for those fragments will be overwritten by a subsequent primitive that has since been input to the rasteriser 104.

It should again be noted here that the fragment shading stage 108 can execute one or more shader programs each comprising a set of instructions for one or more fragment processing (rendering) operations, and that a "kill check" may be performed prior to any one or more or all of those fragment processing (rendering) operations, as desired. Thus, one or more "kill checks" may be performed by the fragment shading stage 108 during the processing of a particular fragment.

The late fragment depth and stencil (ZS) test stage 110 then (if it is to be performed, e.g. where early depth and stencil testing for a fragment has not taken place before shading) carries out, inter alia, the end of pipeline depth test on the shaded fragments (on the covered sampling points associated with shaded fragments) to determine whether the sampling points that a rendered fragment represents will overdraw the fragments whose values are currently stored in the ZS buffers 114 (i.e. determines whether the fragment data for the fragments issuing from the fragment shading stage 108 should be stored in the tile buffers 116 (should replace or modify the fragment data in the tile buffer(s) of the fragments that have already been rendered)).

To do this, the late ZS test stage 110 compares the depth values of (associated with) the fragments issued from the fragment shading stage 108 with the (per-sampling position) depth values stored in the ZS buffers 114 for the sampling points in question. The depth values for sampling points that pass the late depth test are also written appropriately to the ZS buffer 114 to update it.

This late ZS test stage 110 also carries out any necessary "late" alpha and/or stencil tests on the fragments. Alternatively, any necessary "late" alpha and/or stencil tests may be performed by the fragment shading stage 108.

Fragments that fail the late ZS test stage 110 are culled by the late ZS test stage 110. The fragments that pass the late fragment ZS test are then subjected to any remaining operations necessary on the fragments, such as blending with the framebuffer, dither etc. (not shown).

Again, prior to performing one or more fragment processing (depth and/or stencil testing) operations on the fragments it receives, the late ZS testing stage 110 can send an additional fragment discard or "kill check" signal 212 to the fragment tracking record 202 to determine if any fragments for the primitive in question can be at least partially or completely discarded or "killed" at this stage, for example because data for those fragments will be overwritten by a subsequent primitive that has since been input to the rasteriser 104.

For example, the metadata for the primitive in question may indicate that the fragments of that primitive can be completely killed, and thus will not be ZS tested or have their rendered fragment data output to the tile buffer 116. One example where this may occur is when the primitive in question has since been determined by the rasteriser 104 as being behind a completely opaque subsequent primitive that has since been processed by the rasteriser 104.

For another example, the metadata for the primitive in question may indicate that just the ZS testing and/or writing out the ZS test results for the fragments of that primitive can be skipped. The fragment data may, however, still be suitably output to, or suitably combined (e.g. blended) with data for a corresponding sampling position that is already stored in, the tile buffer 116. Again, this can help to reduce processing and bandwidth, but also allow those fragments to contribute to the shading of a sampling position.

It should again be noted here that late ZS testing stage 110 may perform one or more fragment processing (depth and/or stencil testing) operations on the fragments it receives, and that a "kill check" may be performed prior to any one or more or all of those fragment processing (depth and/or stencil testing) operations being performed, as desired. Thus, one or more "kill checks" may be performed by the late ZS testing stage 110 during the processing of a particular fragment.

Finally, any output fragment data is written to appropriate tile buffers 116 that store, an appropriate, e.g. colour, value for each sampling point that the buffers represent (in essence for each sampling position of the tile that is being processed).

Once each tile has been processed, its data is, e.g., exported from the tile buffers 116 to a main memory (e.g. to a frame buffer in a main memory) (not shown) for storage, and the next tile is then processed, and so on, until sufficient tiles have been processed to generate the entire render output (e.g. frame (image) to be displayed).

Other arrangements for the fragment processing pipeline would be possible.

Figure 3:
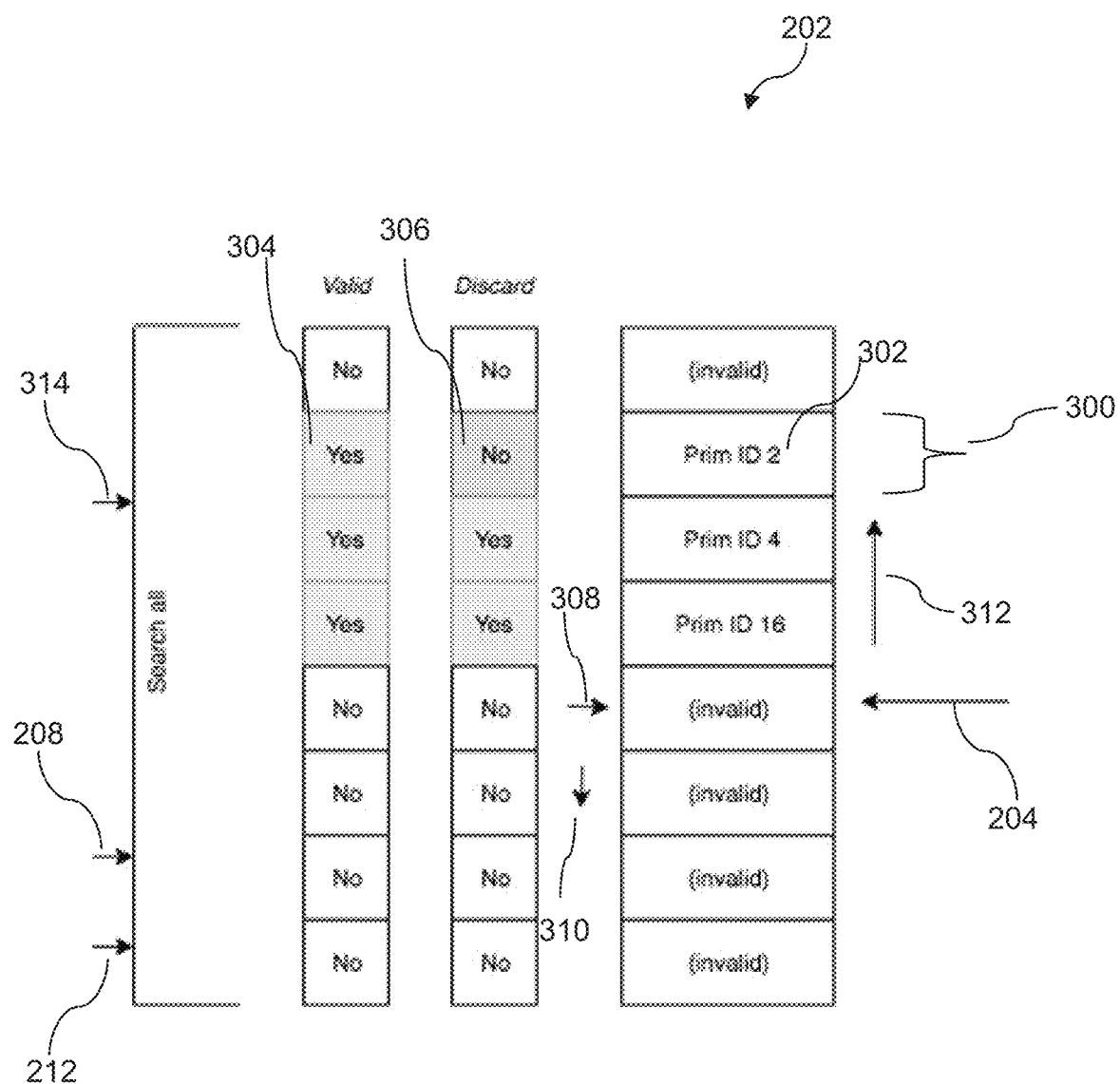
FIG. 3 shows schematically and in more detail a fragment tracking record that can be operated in accordance with the technology described herein.

FIG. 3 illustrates the operation of the fragment tracking record 202 as discussed above in more detail.

In this embodiment, the fragment tracking record 202 comprises plural sets of metadata, such as set of metadata 300, with each set of metadata being assigned to a primitive currently being processed. In the present embodiment, each set of metadata in the fragment tracking record 202 comprises a data field for a primitive identifier, such as primitive identifier 302, associated with the primitive in question.

Each set of metadata in the fragment tracking record 202 also comprises a valid flag, such as valid flag 304, that indicates whether or not that set of metadata is assigned to a primitive that is currently being processed.

Each set of metadata in the fragment tracking record 202 also comprises a discard flag, such as discard flag 306, that indicates whether or not the primitive in question has fragments that can be discarded or "killed", e.g. not processed, in respect of one or more buffers. In the present embodiment, the discard flag 306 can either indicate that the fragments generated from that primitive cannot be discarded or "killed" at all or can be discarded or "killed" entirely (e.g. removed from any further processing).

However, in other embodiments, the metadata may be more sophisticated than this. For example, the metadata may indicate specifically which specific fragment processing operations (e.g. such as ZS testing and ZS results writing) need not be performed in respect of the primitive in question and/or specifically which specific fragment processing operations (e.g. such as fragment rendering and fragment data writing) do need to be performed in respect of the primitive in question. In this case, the metadata may indicate that the primitive in question has fragments that cannot be discarded or "killed" at all, has fragments that can be partially discarded or "killed" (e.g. and may indicate the manner in which they can be partially discarded or "killed"), or has fragments that can be discarded or "killed" entirely (e.g. removed from any further processing).

The process of adding a new primitive to the fragment tracking record 202 (as indicated by arrow 204) will now be discussed.

In this embodiment, the rasteriser 104 makes use of a pointer 308 to the next available entry in the fragment tracking record 202. When a new primitive is received by the rasteriser 104 and passes the coverage and initial ZS testing, and thus is to be added to the fragment tracking record 202 by the rasteriser 104, a primitive identifier associated with that primitive is included in the entry pointed to by the pointer 308. The corresponding valid flag 304 is also set to indicate that the entry corresponds to a valid primitive. The corresponding discard flag 306 is also initially set to indicate that the primitive has fragments that cannot (at least for the time being) be discarded or "killed". The pointer 308 is then moved to the next available entry in the fragment tracking record 202 as indicated by arrow 310.

If the newly added primitive was determined as only partially covering the larger patch (tile) being processed, then nothing more needs to be done for the time being. However, if the newly added primitive was determined as fully covering the larger patch (tile) and passes the initial ZS testing, then a sequential search is conducted back though the metadata entries in the fragment tracking record 202 (as indicated by arrow 312), to identify any previously added primitives that can now be discarded or "killed" because they will generate data that will inevitably be overwritten. When the sequential search encounters a particular previously added primitive for which data will inevitably be overwritten, the discard flag 306 for that particular previously added primitive is set to indicate that the primitive has fragments that can be discarded or "killed". The sequential search terminates when a previously added primitive for which data cannot be overwritten is found.

The process of performing a kill check (as indicated by arrow 208) will now be discussed.

When a kill check is made by the output buffer 206 in respect of fragments of a particular primitive, a search is conducted through the metadata entries in the fragment tracking record 202 for the primitive identifier corresponding to that particular primitive. When that particular primitive is found, the status of the discard flag 306 is checked to see whether the fragments of the particular primitive can be discarded or "killed". If the metadata (discard flag 306) indicates that the fragments of the particular primitive can be discarded, then the fragments of the particular primitive are removed from the output buffer 206 and are not output from the output buffer 206 for further processing. However, if the metadata (discard flag 306) indicates that the fragments of the particular primitive cannot be discarded, then the fragments of the particular primitive can be output from the output buffer 206 for further processing by the graphics processing system.

A similar process of performing a kill check can be performed (as indicated by arrow 216) by one or more other stages of the fragment processing pipeline, such as by the early ZS testing stage 106, the fragment shading pipeline stage 108, and/or the late ZS test stage 110, for example as discussed above.

The process of identifying invalid metadata entries in the pixel kill tracker (as indicated by arrow 314) will now be discussed.

When a particular primitive is invalidated, for example because processing of the primitive or all of its fragments is terminated (e.g. the primitive or all of its fragments have been discarded or "killed") or because processing of the primitive or all of its fragments is completed, a search is conducted through the metadata entries in the fragment tracking record 202 for the primitive identifier corresponding to that particular primitive. When that particular primitive is found, the status of the valid flag 304 corresponding to that primitive is set to invalid. This makes the entry assigned to the particular primitive available for use by another primitive.

Figure 4A:
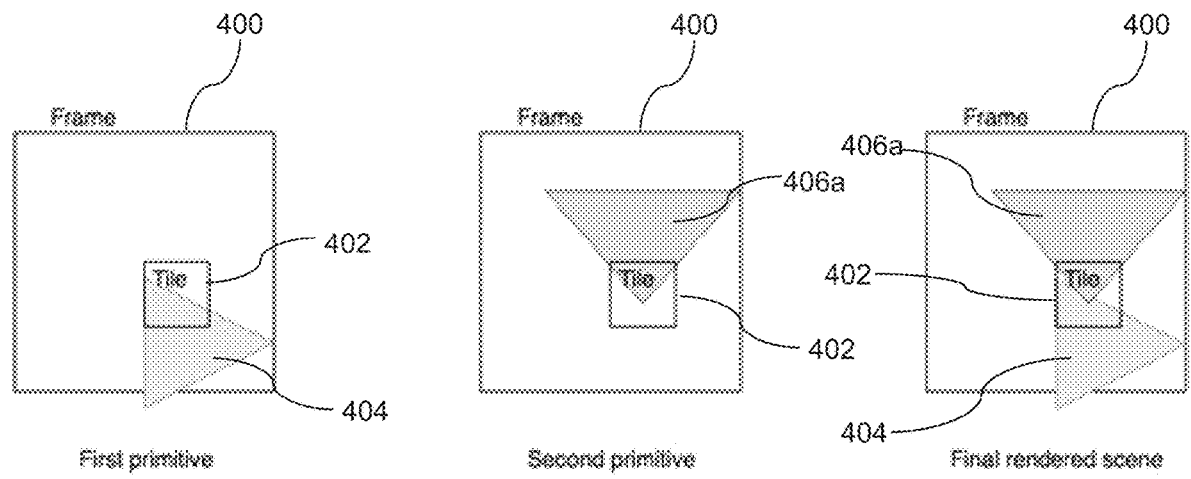
FIGS. 4A and 4B respectively show examples in which fragment discarding (killing) would not be performed and in which fragment discarding (killing) can be performed.

FIG. 4A illustrates a situation (similar to that which is shown in FIG. 2A) in which the fragment data of a subsequent primitive will not overwrite the fragment data of a previous primitive.

FIG. 4A shows a render output (frame) 400 and one patch (tile) 402 of the render output (frame) 400. As is shown on the left hand side of FIG. 4A, a first primitive 404 is received for rasterising in respect of the patch (tile) 402. A primitive identifier for the first primitive 404 is accordingly added to the fragment tracking record 202 by the rasteriser 104 and the metadata (discard flag 306) for the first primitive 404 in the fragment tracking record 202 is initially set to indicate that the fragments for the first primitive 404 cannot be discarded as discussed above.

Next, as is shown in the centre of FIG. 4A, a second primitive 406a is subsequently received for rasterising in respect of the patch (tile) 402. A primitive identifier for the second primitive 406a is accordingly also added to the fragment tracking record 202 by the rasteriser 104 and the metadata (discard flag 306) for the second primitive 406a in the fragment tracking record 202 is initially set to indicate that the fragments for the second primitive 406a cannot be discarded as discussed above.

In this example, the second primitive 406a is determined by the rasteriser 104 as only partially covering the patch (tile) 402. Thus, there is a possibility that the fragment data of the second primitive 406a will not overwrite all the fragment data of the first primitive 404 (indeed, as is shown on the right side of FIG. 4A, the second primitive does not fully cover the first primitive 404). Thus, the metadata (discard flag 306) for first primitive 404 in fragment tracking record 202 is appropriately maintained as indicating that the fragments of the first primitive 404 cannot be discarded.

Figure 4B:
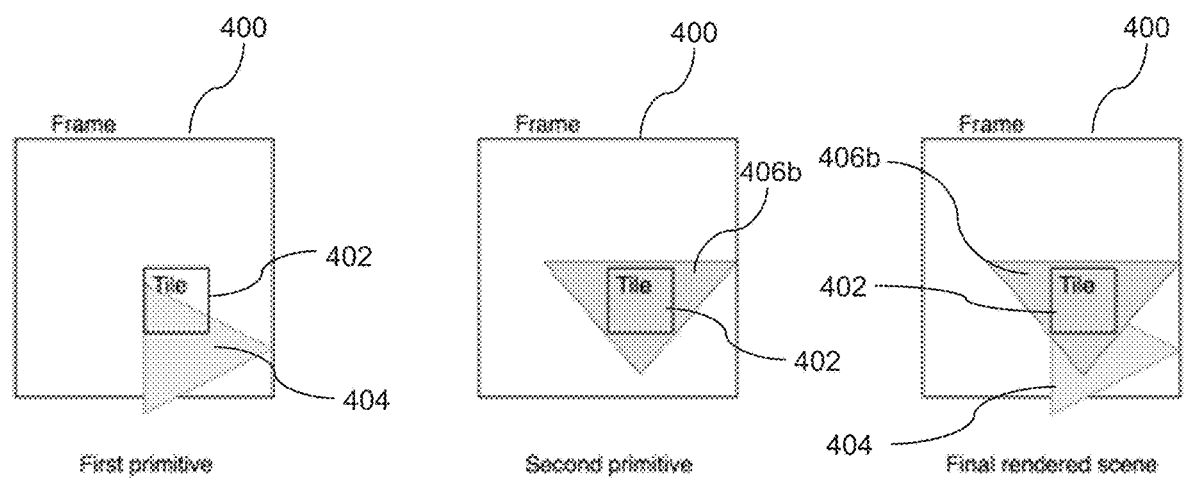

FIG. 4B then illustrates a situation (similar to that which is shown in FIG. 2B) in which the fragment data of a subsequent primitive will overwrite the fragment data of a previous primitive.

FIG. 4B again shows a render output (frame) 400 and one patch (tile) 402 of the render output (frame) 400. As is shown on the left hand side of FIG. 4B, a first primitive 404 is received for rasterising in respect of the patch (tile) 402. A primitive identifier for the first primitive 404 is accordingly added to the fragment tracking record 202 by the rasteriser 104 and the metadata (discard flag 306) for the first primitive 404 in the fragment tracking record 202 is initially set to indicate that the fragments for the first primitive 404 cannot be discarded as discussed above.

Next, as is shown in the centre of FIG. 4B, a second primitive 406b is subsequently received for rasterising in respect of the patch (tile) 402. A primitive identifier for the second primitive 406b is accordingly also added to the fragment tracking record 202 by the rasteriser 104 and the metadata (discard flag 306) for the second primitive 406b in the fragment tracking record 202 is initially set to indicate that the fragments for the second primitive 406b cannot be discarded.

In this example, the second primitive 406b is determined by the rasteriser 104 as fully covering the patch (tile) 402. The second primitive 406b is also entirely opaque and is determined by the hierarchical ZS test stage 120 to be in front of the first primitive 404. Thus, the fragment data of the second primitive 406b will overwrite all the fragment data of the first primitive 404 (as is shown on the right side of FIG. 4B, the second primitive 406b fully covers the first primitive 404). Thus, the metadata (discard flag 306) for first primitive 404 in the fragment tracking record 202 is appropriately set to indicate that the fragments of the first primitive 404 can be discarded, for example in response to a pixel kill check made by the output buffer stage 214 or by one or more other fragment processing stages of the graphics processing system.

It can be seen from the above that embodiments of the technology described herein can provide an efficient way to reduce the amount of further processing of fragments for one or more previously received primitives that are later found by one or more earlier stages of the graphics processing system to be suitably covered by a subsequently received primitive. This is achieved in embodiments of the technology described herein by the graphics processing system storing metadata relating to the one or more previously received primitives. The metadata can indicate that the one or more previously received primitives are suitably covered by (e.g. will have their fragment data overwritten by) the subsequently received primitive. The metadata stored for the one or more previously received primitives can then later be queried by one or more later stages of the graphics processing system to determine whether one or more fragments for the one or more previously received primitives can be discarded or "killed".

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of processing graphics primitives when generating a render output in a graphics processing system, the method comprising:

performing, by one or more earlier stages of the graphics processing system, the steps of:
determining whether a subsequently received primitive to be rasterized covers a previously received primitive such that one or more fragment processing steps need not be performed in respect of the previously received primitive; and
when it is determined that the subsequently received primitive to be rasterized covers the previously received primitive such that one or more fragment processing steps need not be performed in respect of the previously received primitive, storing metadata for the previously received primitive that indicates that those one or more fragment processing steps need not be performed in respect of the previously received primitive; and performing, by one or more later stages of the graphics processing system, the steps of:
prior to performing one or more fragment processing steps in respect of the previously received primitive, querying the metadata stored for the previously received primitive to determine whether one or more fragment processing steps need not be performed in respect of the previously received primitive; and
when it is determined that one or more fragment processing steps need not be performed in respect of the previously received primitive, not performing those one or more fragment processing steps in respect of the previously received primitive.

2. The method of claim 1, wherein:
the one or more later stages of the graphics processing system comprise a fragment output buffer that issues fragments to one or more even later stages of the graphics processing system; and
the one or more fragment processing steps that need not be performed in respect of the previously received primitive comprise a step of issuing one or more fragments in respect of the previously received primitive to one or more even later stages of the graphics processing system.

3. The method of claim 1, wherein:
the one or more later stages of the graphics processing system comprise one or more of: an early fragment depth or stencil testing stage; a fragment renderer; and a late fragment depth or stencil testing stage; and
the one or more fragment processing steps that need not be performed in respect of the previously received primitive comprise one or more of: a step of performing an early fragment depth or stencil test; a step of writing out early fragment depth or stencil test results to a buffer of the graphics processing system; a step of performing fragment rendering to generate rendered fragment data; a step of writing out rendered fragment data to a buffer of the graphics processing system; a step of performing a late fragment depth or stencil test; and a step of writing out late fragment depth or stencil test results to a buffer of the graphics processing system.

4. The method of claim 1, wherein:
when determining whether the subsequently received primitive to be rasterized covers the previously received primitive such that one or more fragment processing steps need not be performed in respect of the previously received primitive, the one or more earlier stages determine specifically which one or more fragment processing steps of plural fragment processing steps need not be performed in respect of the previously received primitive, and store metadata for the previously received primitive that indicates specifically which one or more fragment processing steps of plural fragment processing steps need not be performed in respect of the previously received primitive.

5. The method of claim 4, wherein:
the one or more fragment processing steps of plural fragment processing steps that specifically need not be performed in respect of the previously received primitive comprise one or more of: a step of performing a fragment depth or stencil test; and a step of writing out fragment depth or stencil test results to a buffer of the graphics processing system; or
the one or more fragment processing steps of plural fragment processing steps that specifically do need to be performed in respect of the previously received primitive comprise one or more of: a step of performing fragment rendering to generate rendered fragment data; and a step of writing out rendered fragment data to a buffer of the graphics processing system.

6. The method of claim 1, wherein:
when determining whether the subsequently received primitive to be rasterized covers the previously received primitive such that one or more fragment processing steps need not be performed in respect of the previously received primitive, the one or more earlier stages search though plural sets of metadata stored respectively for plural previously received primitives to determine whether one or more previously received primitives are covered by the subsequently received primitive to be rasterized.

7. The method of claim 6, wherein:
the searching is conducted sequentially backwards though the plural sets of metadata stored respectively for the plural previously received primitives, and the searching is terminated when it is determined that at least one of the plural previously received primitives is not covered by the subsequently received primitive to be rasterized.

8. The method of claim 1, wherein:
for the purposes of generating the render output, the render output is divided into a plurality of patches;
the one or more earlier stages test a patch of the render output against the subsequently received primitive to be rasterized to determine if the subsequently received primitive to be rasterized completely covers the patch of the render output; and
when it is determined that the subsequently received primitive to be rasterized completely covers the patch of the render output, the one or more earlier stages perform one or more additional steps to determine whether the subsequently received primitive to be rasterized covers the previously received primitive in respect of that patch;
when it is determined that the subsequently received primitive to be rasterized does not completely cover the patch of the render output, the one or more earlier stages do not perform one or more additional steps to determine whether the subsequently received primitive to be rasterized covers the previously received primitive in respect of that patch.

9. The method of claim 1, wherein:
for the purposes of generating the render output, the render output is divided into a plurality of larger patches, with each larger patch of the render output encompassing a set of plural smaller patches of the render output;
the one or more earlier stages test a larger patch of the render output against the subsequently received primitive to be rasterized to determine if the subsequently received primitive to be rasterized at least partially covers the larger patch of the render output; and
when it is determined that the subsequently received primitive to be rasterized does not at least partially cover the larger patch of the render output, the one or more earlier stages discard the subsequently received primitive to be rasterized from further processing in respect of the larger patch;
when it is determined that the subsequently received primitive to be rasterized at least partially covers the larger patch of the render output, the one or more earlier stages sub-divide the larger patch into plural smaller patches of the render output and tests at least one of the smaller patches of the render output against the subsequently received primitive to be rasterized to determine if the subsequently received primitive to be rasterized at least partially or completely covers the at least one smaller patch of the render output.

10. A graphics processing system for processing graphics primitives when generating a render output, the system comprising:
one or more earlier stages comprising primitive processing circuitry configured to:

determine whether a subsequently received primitive to be rasterized covers a previously received primitive such that one or more fragment processing steps need not be performed in respect of the previously received primitive; and when it is determined that the subsequently received primitive to be rasterized covers the previously received primitive such that one or more fragment processing steps need not be performed in respect of the previously received primitive, store metadata for the previously received primitive that indicates that those one or more fragment processing steps need not be performed in respect of the previously received primitive; and one or more later stages comprising fragment processing circuitry configured to:

prior to performing one or more fragment processing steps in respect of the previously received primitive, query metadata stored for the previously received primitive to determine whether one or more fragment processing steps need not be performed in respect of the previously received primitive; and when it is determined that one or more fragment processing steps need not be performed in respect of the previously received primitive, not perform those one or more fragment processing steps in respect of the previously received primitive.

11. The system of claim 10, wherein:
the one or more later stages of the graphics processing system comprise a fragment output buffer that issues fragments to one or more even later stages of the graphics processing system; and
the one or more fragment processing steps that need not be performed in respect of the previously received primitive comprise a step of issuing one or more fragments in respect of the previously received primitive to one or more even later stages of the graphics processing system.

12. The system of claim 10, wherein:
the one or more later stages of the graphics processing system comprise one or more of: an early fragment depth or stencil testing stage; a fragment renderer; and a late fragment depth or stencil testing stage; and
the one or more fragment processing steps that need not be performed in respect of the previously received primitive comprise one or more of: a step of performing an early fragment depth or stencil test; a step of writing out early fragment depth or stencil test results to a buffer of the graphics processing system; a step of performing fragment rendering to generate rendered fragment data; a step of writing out rendered fragment data to a buffer of the graphics processing system; a step of performing a late fragment depth or stencil test; and a step of writing out late fragment depth or stencil test results to a buffer of the graphics processing system.

13. The system of claim 10, wherein:
the one or more earlier stages are configured to, when determining whether the subsequently received primitive to be rasterized covers the previously received primitive such that one or more fragment processing steps need not be performed in respect of the previously received primitive, determine specifically which one or more fragment processing steps of plural fragment processing steps need not be performed in respect of the previously received primitive, and store metadata for the previously received primitive that indicates specifically which one or more fragment processing steps of plural fragment processing steps need not be performed in respect of the previously received primitive.

14. The system of claim 13, wherein:
the one or more fragment processing steps of plural fragment processing steps that specifically need not be performed in respect of the previously received primitive comprise one or more of: a step of performing a fragment depth or stencil test; and a step of writing out fragment depth or stencil test results to a buffer of the graphics processing system; or
the one or more fragment processing steps of plural fragment processing steps that specifically do need to be performed in respect of the previously received primitive comprise one or more of: a step of performing fragment rendering to generate rendered fragment data; and a step of writing out rendered fragment data to a buffer of the graphics processing system.

15. The system of claim 10, wherein:
the one or more earlier stages are configured to, when determining whether the subsequently received primitive to be rasterized covers the previously received primitive such that one or more fragment processing steps need not be performed in respect of the previously received primitive, search though plural sets of metadata stored respectively for plural previously received primitives to determine whether one or more previously received primitives are covered by the subsequently received primitive to be rasterized.

16. The system of claim 15, wherein:
the searching is conducted sequentially backwards though the plural sets of metadata stored respectively for the plural previously received primitives, and the searching is terminated when it is determined that at least one of the plural previously received primitives is not covered by the subsequently received primitive to be rasterized.

17. The system of claim 10, wherein:
for the purposes of generating the render output, the render output is divided into a plurality of patches;
the one or more earlier stages are configured to test a patch of the render output against the subsequently received primitive to be rasterized to determine if the subsequently received primitive to be rasterized completely covers the patch of the render output; and
the one or more earlier stages are configured to, when it is determined that the subsequently received primitive to be rasterized completely covers the patch of the render output, perform one or more additional steps to determine whether the subsequently received primitive to be rasterized covers the previously received primitive in respect of that patch;
the one or more earlier stages are configured to, when it is determined that the subsequently received primitive to be rasterized does not completely cover the patch of the render output, not perform one or more additional steps to determine whether the subsequently received primitive to be rasterized covers the previously received primitive in respect of that patch.

18. The system of claim 10, wherein:
for the purposes of generating the render output, the render output is divided into a plurality of larger patches, with each larger patch of the render output encompassing a set of plural smaller patches of the render output;
the one or more earlier stages are configured to test a larger patch of the render output against the subsequently received primitive to be rasterized to determine if the subsequently received primitive to be rasterized at least partially covers the larger patch of the render output; and the one or more earlier stages are configured to, when it is determined that the subsequently received primitive to be rasterized does not at least partially cover the larger patch of the render output, discard the subsequently received primitive to be rasterized from further processing in respect of the larger patch;

the one or more earlier stages are configured to, when it is determined that the subsequently received primitive to be rasterized at least partially covers the larger patch of the render output, sub-divide the larger patch into plural smaller patches of the render output and test at least one of the smaller patches of the render output against the subsequently received primitive to be rasterized to determine if the subsequently received primitive to be rasterized at least partially or completely covers the at least one smaller patch of the render output.

19. A non-transitory computer readable storage medium storing computer software code which, when executing on a processor of a graphics processing system, performs a method of processing graphics primitives when generating a render output, the method comprising:

causing one or more earlier stages of the graphics processing system to:

determine whether a subsequently received primitive to be rasterized covers a previously received primitive such that one or more fragment processing steps need not be performed in respect of the previously received primitive; and when it is determined that the subsequently received primitive to be rasterized covers the previously received primitive such that one or more fragment processing steps need not be performed in respect of the previously received primitive, store metadata for the previously received primitive that indicates that those one or more fragment processing steps need not be performed in respect of the previously received primitive; and causing one or more later stages of the graphics processing system to:

prior to performing one or more fragment processing steps in respect of the previously received primitive, query the metadata stored for the previously received primitive to determine whether one or more fragment processing steps need not be performed in respect of the previously received primitive; and when it is determined that one or more fragment processing steps need not be performed in respect of the previously received primitive, not perform those one or more fragment processing steps in respect of the previously received primitive.

* * * * *